US010172172B2

(12) United States Patent
Baghel et al.

(10) Patent No.: US 10,172,172 B2
(45) Date of Patent: Jan. 1, 2019

(54) DEVICE-TO-DEVICE CAPABILITY SIGNALING

(71) Applicant: QUALCOMM Incorporated, San Diego, CA (US)

(72) Inventors: Sudhir Kumar Baghel, Bridgewater, NJ (US); Peter Gaal, San Diego, CA (US); Kapil Gulati, Franklin Park, NJ (US); Amir Aminzadeh Gohari, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 195 days.

(21) Appl. No.: 14/819,843

(22) Filed: Aug. 6, 2015

(65) Prior Publication Data

US 2016/0044730 A1 Feb. 11, 2016

Related U.S. Application Data

(60) Provisional application No. 62/034,520, filed on Aug. 7, 2014.

(51) Int. Cl.
*H04W 4/80* (2018.01)
*H04W 8/00* (2009.01)
(Continued)

(52) U.S. Cl.
CPC ........... *H04W 76/14* (2018.02); *H04W 4/021* (2013.01); *H04W 4/80* (2018.02); *H04W 8/24* (2013.01); *H04W 72/02* (2013.01); *H04W 8/005* (2013.01)

(58) Field of Classification Search
CPC ... H04W 8/005; H04W 76/023; H04W 4/008; H04W 72/0413; H04W 72/042;
(Continued)

(56) References Cited

U.S. PATENT DOCUMENTS

2015/0148049 A1* 5/2015 Alberth, Jr. ......... H04W 72/082
455/450
2015/0327201 A1* 11/2015 He ....................... H04W 48/16
370/336

FOREIGN PATENT DOCUMENTS

GB         2497579 A        6/2013
WO    WO-2011087408 A1     7/2011
WO    WO-2013068788 A1     5/2013

OTHER PUBLICATIONS

IPEA/EP, Second Written Opinion of the International Preliminary Examining Authority, Int'l. App. No. PCT/US2015/044247, dated Jul. 11, 2016, European Patent Office, Munich, DE, 9 pgs.
(Continued)

*Primary Examiner* — Ayaz R Sheikh
*Assistant Examiner* — Debebe A Asefa
(74) *Attorney, Agent, or Firm* — Holland & Hart LLP/Qualcomm

(57) ABSTRACT

Methods, systems, and devices are described for signaling device-to-device (D2D) capability information. A user equipment (UE) may determine a frequency band list of frequency bands supported for D2D proximity service communications. Based on the frequency band list, the UE may determine a proximity service record for a frequency band combination parameter, the frequency band combination parameter associated with non-D2D communications. The proximity service record may include a reduced capabilities record for the frequency band combination parameter that indicates reduced capabilities for non-D2D communications when D2D proximity service communications are active.

66 Claims, 13 Drawing Sheets

(51) Int. Cl.
    *H04W 8/24*      (2009.01)
    *H04W 4/021*     (2018.01)
    *H04W 76/14*     (2018.01)
    *H04W 72/02*     (2009.01)

(58) Field of Classification Search
    CPC ........... H04W 72/0453; H04W 72/048; H04W 72/0493; H04W 4/021; H04W 52/383; H04W 72/02; H04W 74/006; H04W 8/24; H04L 47/40; H04L 5/00
    See application file for complete search history.

(56) References Cited

OTHER PUBLICATIONS

3GPP, "D2D Capability for Multi-carrier Capable UE," 3GPP TSG-RAN WG2 #86, R2-142634, Seoul, Korea; May 19-23, 2014, 3 pgs., XP_050793717A, 3rd Generation Partnership Project.
ISA/EPO, International Search Report and Written Opinion of the International Searching Authority, Int'l. App. No. PCT/US2015/044247, dated Nov. 5, 2015, European Patent Office, Rijswijk, NL, 14 pgs.
Qualcomm Incorporated, "ProSe Capability Signaling", 3GPP TSG-RAN WG2 #87, R2-143677, Dresden, Germany, Aug. 18-22, 2014, 4 pgs., XP_050819803A, 3rd Generation Partnership Project.

* cited by examiner

DEVICE-TO-DEVICE CAPABILITY SIGNALING

CROSS REFERENCES

The present application for patent claims priority to U.S. Provisional Patent Application No. 62/034,520 by Baghel, et al., entitled "Device-To-Device Capability Signaling," filed Aug. 7, 2014, assigned to the assignee hereof, and expressly incorporated by reference herein.

BACKGROUND

Field of the Disclosure

The present disclosure, for example, relates to wireless communication systems, and more particularly to implementation of device-to-device capability signaling.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may communicate with one or more base stations utilizing carrier aggregation (CA) techniques, for example, which generally utilizes multiple carriers that are combined at the UE to increase data rates. The UE may utilize UE resources (e.g., transmit chain, receive chain, etc.) to fully implement CA.

Device-to-device (D2D) communications involve direct wireless communications between UEs. D2D communications may provide for proximity service functions to be performed between UEs within the same geographic area, e.g., announcements within a defined geographic area, sale information within a shopping mall, etc. When D2D communications are active, however, resources associated with non-D2D communications may be unavailable (e.g., CA transmission/reception). Signaling of D2D proximity service communications capabilities and any other corresponding impact on non-D2D communications is unavailable.

SUMMARY

The described features generally relate to one or more improved systems, methods, and/or apparatuses for signaling D2D proximity service communications capabilities. In some examples, frequency bands are identified that are associated with D2D proximity service communications. Based on the identified frequency bands, a proximity service record for a frequency band combination parameter is determined. The frequency band combination parameter may include a frequency band combination associated with non-D2D communications (e.g., CA communications). The proximity service record may include information indicative of a configuration change to the frequency band combination parameter based on the frequency bands associated with D2D proximity service communications being active. In some examples, the proximity service record may convey information associated with a reduction in the capability for non-D2D communications while the frequency bands for D2D proximity service communications are in use.

In other examples, information is received that is indicative of a proximity service record for a frequency band combination parameter. The frequency band combination parameter may include information associated with frequency bands used for non-D2D communications (e.g., wide area network (WAN) CA communications). Based on the proximity service record, a capability configuration for non-D2D communications may be determined for a mobile device (e.g., UE). The capability configuration may indicate a capability reduction for non-D2D communications when frequency bands associated with D2D proximity service communications are active at the mobile device. Accordingly, the capability configuration may provide for a CA capability determination when D2D proximity service communications are active at the mobile device.

According to a first illustrative set of examples, a method for wireless communications is provided. The method may include: identifying one or more frequency bands configured for device-to-device (D2D) proximity service communications; and determining, based on the identified one or more frequency bands, a proximity service record for a frequency band combination parameter, the frequency band combination parameter associated with non-D2D communications.

In some aspects, the method may also include determining, based on the identified one or more frequency bands, a proximity service frequency band list, and sending, to a serving cell, a proximity service capability record comprising information indicative of the proximity service frequency band list. Determining the proximity service capability record may include determining one or more proximity service communication parameters associated with D2D proximity service communications. The method may include determining the one or more proximity service parameters comprise one or more of a D2D discovery type capability, an asynchronous D2D discovery capability, an out-of-coverage discovery capability, a D2D communication mode capability, or a combination thereof.

In some aspects, determining the proximity service record may include determining a first capability configuration for the non-D2D communications using the frequency band combination, and determining a second capability configuration for the non-D2D communications based on the identified one or more frequency bands configured for D2D proximity service communications. Determining the second capability configuration may include determining, for the one or more frequency bands configured for D2D proximity service communications, a capability reduction record for the frequency band combination. The capability reduction record may include information indicative of a reduced non-D2D communication capability when at least one of the identified one or more frequency bands is used for D2D proximity service communications. The capability reduction record for the frequency band combination may include one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, a measurement capability indicator, or a combination thereof.

In some aspects, the method may include sending, to a serving cell, a start message including information indicating that D2D proximity services are active. The start message may include an updated proximity service record for the frequency band combination parameter, the updated proximity service record based on the one or more frequency bands used for the active D2D proximity service communications. The method may include determining, based on D2D proximity services being active, a reduced capability for non-D2D communications. The method may include receiving, from the serving cell, a radio resource control (RRC) connection reconfiguration message comprising an indication of resources to utilize for the reduced capability for non-D2D communications. The method may include pausing non-D2D communications for a predetermined time period during an RRC connection reconfiguration procedure.

In some aspects, the method may include sending, to a serving cell, a stop message including information indicating that D2D proximity services are inactive. The stop message may include an updated proximity service record for the frequency band combination parameter, the updated proximity service record based on the one or more frequency bands being available due to the inactive D2D proximity service communications. The method may include determining, based on D2D proximity services being inactive, a full capability configuration for D2D proximity service communications. The non-D2D communications may be carrier aggregation communications.

In some aspects, the method may include determining, based on D2D proximity services being active, a reduced capability configuration for non-D2D communications when a pool of resources associated with D2D proximity service communications is provided. The method may include pausing non-D2D communications for a predetermined period of time to conduct radio frequency tuning operations, wherein the pausing occurs before and after accessing the pool of resources for D2D proximity service communications.

In a second set of illustrative examples, an apparatus for wireless communications is provided. The apparatus may include: a processor; memory in electronic communication with the processor; and instructions being stored in the memory, the instructions being executable by the processor. The instructions may be executable by the processor to: identify one or more frequency bands configured for device-to-device (D2D) proximity service communications; and determine, based on the identified one or more frequency bands, a proximity service record for a frequency band combination parameter, the frequency band combination parameter associated with non-D2D communications.

In some aspects, the apparatus may include instructions executable by the processor to: determine, based on the identified one or more frequency bands, a proximity service frequency band list; and send, to a serving cell, a proximity service capability record comprising information indicative of the proximity service frequency band list. The instructions executable to determine the proximity service capability record may be further executable to determine one or more proximity service communication parameters associated with D2D proximity service communications. The apparatus may include instructions executable by the processor to determine the one or more proximity service parameters comprise one or more of a D2D discovery type capability, an asynchronous D2D discovery capability, an out-of-coverage discovery capability, a D2D communication mode capability, or a combination thereof.

In some aspects, the instructions executable to determine the proximity service record are further executable to: determine a first capability configuration for the non-D2D communications using the frequency band combination; and determine a second capability configuration for the non-D2D communications based on the identified one or more frequency bands configured for D2D proximity service communications. The instructions executable to determine the second capability configuration may be further executable to determine, for the one or more frequency bands configured for D2D proximity service communications, a capability reduction record for the frequency band combination.

In some aspects, the capability reduction record includes information indicative of a reduced non-D2D communication capability when at least one of the identified one or more frequency bands is used for D2D proximity service communications. The capability reduction record for the frequency band combination may include one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, a measurement capability indicator, or a combination thereof.

In some aspects, the apparatus may include instructions executable by the processor to send, to a serving cell, a start message including information indicating that D2D proximity services are active.

In a third set of illustrative examples, an apparatus for wireless communications is provided. The apparatus may include: means for identifying one or more frequency bands configured for device-to-device (D2D) proximity service communications; and means for determining, based on the identified one or more frequency bands, a proximity service record for a frequency band combination parameter, the frequency band combination parameter associated with non-D2D communications.

In some aspects, the apparatus may include: means for determining, based on the identified one or more frequency bands, a proximity service frequency band list; and means for sending, to a serving cell, a proximity service capability record comprising information indicative of the proximity service frequency band list. The means for determining the proximity service capability record may include means for determining one or more proximity service communication parameters associated with D2D proximity service communications. The apparatus may include means for determining the one or more proximity service parameters comprise one or more of a D2D discovery type capability, an asynchronous D2D discovery capability, an out-of-coverage discovery capability, a D2D communication mode capability, or a combination thereof.

In some aspects, the means for determining the proximity service record may include: means for determining a first capability configuration for the non-D2D communications using the frequency band combination; and means for determining a second capability configuration for the non-D2D communications based on the identified one or more frequency bands configured for D2D proximity service communications.

In a fourth set of illustrative examples, a non-transitory computer-readable medium storing computer executable code for wireless communication is provided. The code may be executable by the processor to: identify one or more frequency bands configured for device-to-device (D2D) proximity service communications; and determine, based on the identified one or more frequency bands, a proximity service record for a frequency band combination parameter, the frequency band combination parameter associated with non-D2D communications.

In a fifth set of illustrative examples, a method for wireless communications is provided. The method may include: receiving information indicative of a proximity service record for a frequency band combination parameter, the frequency band combination parameter associated with non-device-to-device (D2D) communications for a mobile device; and determining, based on the proximity service record, a capability configuration for non-D2D communications of the mobile device.

In some aspects, the proximity service record may include a capability reduction record for the frequency band combination parameter. The capability reduction record may include information indicative of a reduced non-D2D communication capability when at least one of one or more frequency bands associated with D2D proximity service communications is in use. The capability reduction record for the frequency band combination may include one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, and a measurement capability indicator.

In some aspects, the method may include receiving a start message from the mobile device that D2D proximity service communications are active. The start message may include an updated proximity service record for the frequency band combination parameter, the updated proximity service record based on one or more frequency bands used for the active D2D proximity service communications. The method may include determining, based on the D2D proximity service communications being active, a reduced capability for non-D2D communications.

In some aspects, the method may include receiving a stop message from the mobile device that D2D proximity service communications are inactive. The stop message may include an updated proximity service record for the frequency band combination parameter, the updated proximity service record based on one or more frequency bands associated with D2D proximity service communications being available due to the inactive D2D proximity service communications. The method may include determining, based on the D2D proximity service communications being inactive, a full capability configuration for non-D2D communications.

In some aspects, the method may include scheduling one or more resources for the mobile device based on the proximity service record. The information indicative of the proximity service record may be received from the mobile device. The information indicative of the proximity service record may be received from a network entity. The method may include receiving a proximity service capability record including information indicative of a proximity service frequency band list and one or more proximity service communication parameters. The one or more proximity service parameters may include one or more of a D2D discovery type capability, an asynchronous D2D discovery capability, an out-of-coverage discovery capability, and a D2D communication mode capability.

In a sixth set of illustrative examples, an apparatus for wireless communications is provided. The apparatus may include: a processor; memory in electronic communication with the processor; and instructions being stored in the memory. The instructions being executable by the processor to: receive information indicative of a proximity service record for a frequency band combination parameter, the frequency band combination parameter associated with non-device-to-device (D2D) communications for a mobile device; and determine, based on the proximity service record, a capability configuration for non-D2D communications of the mobile device.

In some aspects, the proximity service record may include a capability reduction record for the frequency band combination parameter. The capability reduction record may include information indicative of a reduced non-D2D communication capability when at least one of one or more frequency bands associated with D2D proximity service communications is in use. The capability reduction record for the frequency band combination may include one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, and a measurement capability indicator.

In some aspects, the apparatus may include instructions executable by the processor to receive a start message from the mobile device that D2D proximity service communications are active. The start message may include an updated proximity service record for the frequency band combination parameter, the updated proximity service record based on one or more frequency bands used for the active D2D proximity service communications. The apparatus may include instructions executable by the processor to determine, based on the D2D proximity service communications being active, a reduced capability for non-D2D communications.

In some aspects, the apparatus may include instructions executable by the processor to receive a stop message from the mobile device that D2D proximity service communications are inactive. The stop message may include an updated proximity service record for the frequency band combination parameter, the updated proximity service record based on one or more frequency bands associated with D2D proximity service communications being available due to the inactive D2D proximity service communications. The apparatus may include instructions executable by the processor to determine, based on the D2D proximity service communications being inactive, a full capability configuration for non-D2D communications.

In some examples, the apparatus may include instructions executable by the processor to schedule one or more resources for the mobile device based on the proximity service record.

In a seventh set of illustrative examples, an apparatus for wireless communication is provided. The apparatus may include: means for receiving information indicative of a proximity service record for a frequency band combination parameter, the frequency band combination parameter associated with non-device-to-device (D2D) communications for a mobile device; and means for determining, based on the proximity service record, a capability configuration for non-D2D communications of the mobile device.

In some aspects, the proximity service record may include a capability reduction record for the frequency band combination parameter. The capability reduction record may include information indicative of a reduced non-D2D communication capability when at least one of one or more frequency bands associated with D2D proximity service communications is in use. The capability reduction record for the frequency band combination may include one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, and a measurement capability indicator. The apparatus may include means for receiving a start message from the mobile device that D2D proximity service communications are active.

In an eighth set of illustrative examples, a non-transitory computer-readable medium storing computer executable code for wireless communication is provided. The code may be executable by a processor to: receive information indicative of a proximity service record for a frequency band combination parameter, the frequency band combination parameter associated with non-device-to-device (D2D) communications for a mobile device; and determine, based on the proximity service record, a capability configuration for non-D2D communications of the mobile device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
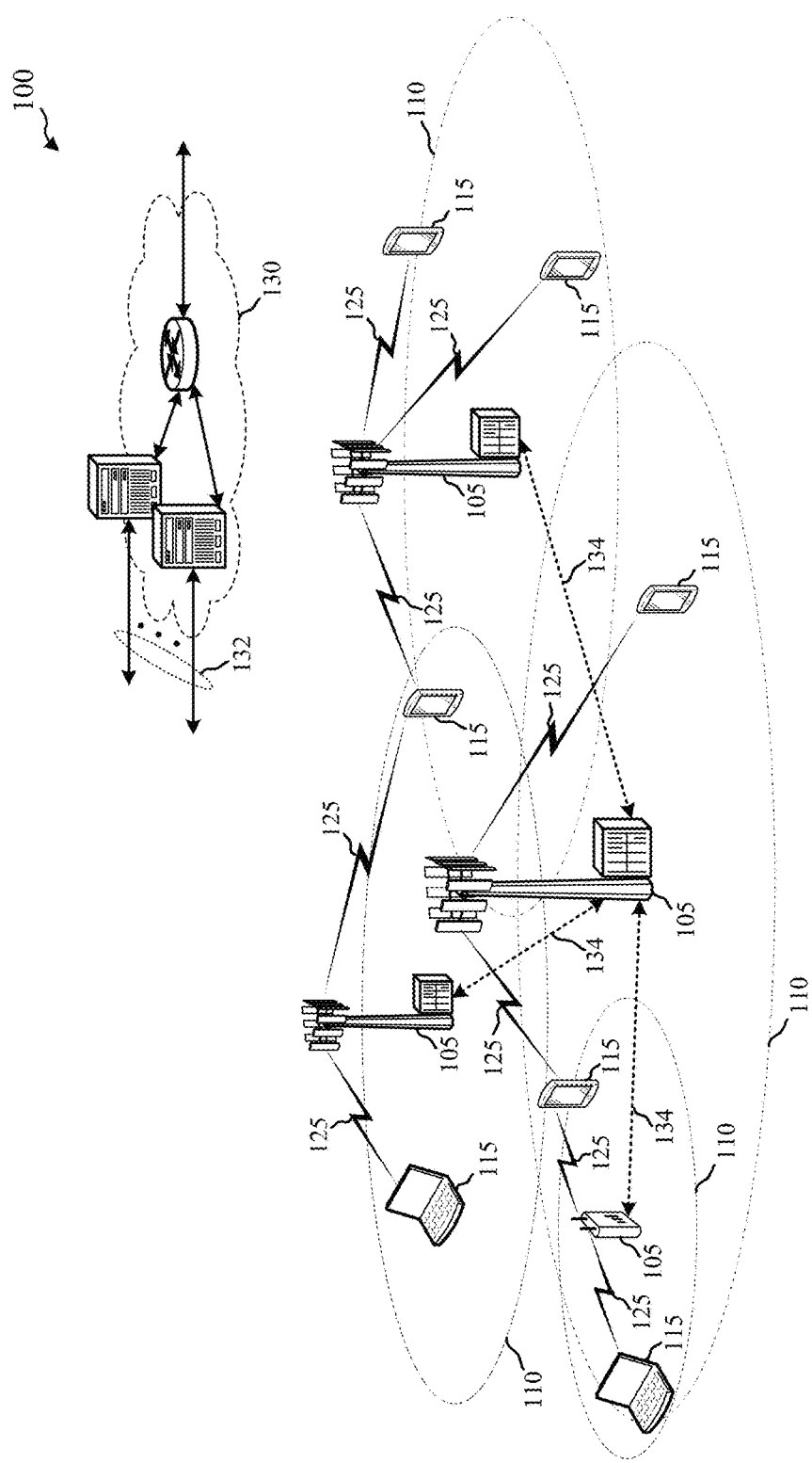
FIG. 1 shows a block diagram of a wireless communication system, in accordance with various aspects of the present disclosure.

Currently, a UE may, for D2D communication operations for example, simultaneously receive on the downlink and the uplink for D2D proximity service communications. A UE may, for D2D discovery operations for example, receive on the downlink or the uplink for D2D proximity service communications (although simultaneous reception may be supported by some UEs). Additionally, aspects of non-D2D communications (e.g., CA) may not be supported when the UE is communicating via D2D proximity service communications. This may be attributable to the finite resources on the UE (e.g., receive chains, transmit chains, etc.) being used for D2D proximity service communications and, therefore not available for non-D2D communications. Accordingly, current protocols may not provide for a UE to signal its D2D proximity service communication capabilities and, where applicable, the impact on non-D2D communications when D2D proximity service communications are engaged.

According to aspects of the present description, a UE may signal its D2D proximity service communication capabilities and also convey an indication of non-D2D communication reduced capabilities. The UE may determine its D2D proximity service communication capabilities, e.g., discovery type(s) supported, communication mode(s) supported, etc. The UE may also determine its frequency band list of frequency bands that it is configured to support for D2D proximity service communications. The UE may also, for a frequency band combination (e.g., a group of frequencies associated with non-D2D communications), determine a proximity service record. The proximity service record may, for the frequency bands that the UE supports D2D proximity service communications, indicate a reduced capabilities configuration for the frequency band combination. As one example and for the D2D frequency bands, the proximity service record may convey an indication of reduced non-D2D communication capabilities configuration when the UE utilizes the D2D frequency band (and associated UE resources) for D2D proximity service communications. The UE may convey this information to an eNB when it is powered up and/or upon initial registration, for example.

According to additional aspects of the present disclosure, the eNB may receive the indication of the D2D proximity service communication capabilities and the indication of non-D2D communication reduced capabilities for the UE. The eNB may receive this information from the UE (during initial registration, for example) and/or from a network entity (e.g., a mobility management entity, previous serving cell of the UE, etc.). The eNB may determine a capability configuration for non-D2D communications based on the received information. Accordingly, the eNB may determine capabilities configuration for non-D2D communications for the UE when the UE is engaged in D2D proximity service communications. In some aspects, the eNB may send the reduced capabilities configuration to the UE via a radio resource control (RRC) connection reconfiguration message. In this aspect, the UE may pause or otherwise interrupt the uplink and/or downlink non-D2D communications for 1 subframe, for example, of the RRC connection reconfiguration procedure to conduct radio frequency (RF) tuning operations. Further, the eNB may also make one or more scheduling decisions of resources for the UE based on the D2D proximity service communication capabilities and reduced non-D2D communication capabilities. For example, the eNB may refrain from assigning CA related resources for the UE engaged in active D2D proximity service communication considering that the UE resources are not available.

In some cases, a set of frequency bands, such as the frequency band combination, may be used for CA. However, at times not all of the set may be used for CA due to limited resources. For example, available resources may be reduced due to D2D communications. The proximity service record may indicate, for the set (e.g., indicating for some or all subsets of the set of frequency bands), available D2D resources. The indication may be an indication (e.g., a binary indication) whether simultaneous D2D reception (and/or D2D transmission) in a frequency band is possible when a frequency band combination is used for CA (or for other non-D2D communications), or the indication may convey which resources may be used for D2D communications. For example, if the UE may use frequency bands A, B, C, and D for CA or other non-D2D communications, the proximity service record, or capability reduction record, may indicate that D2D communications, such as simultaneous D2D communications, are not possible when using frequency bands A, B, C, and D; frequency band X may be used for D2D communications when using frequency bands A, B, and C or frequency bands B, C, and D; frequency band Y may be used for D2D communications when using frequency bands A and B or C and B; frequency band Z may be used for D2D communications when using frequency band A, B, or D; etc. Frequency bands X, Y, or Z may or may not be one of frequency bands A, B, C, and D. It should be noted that the UE may have, and the proximity service record or capability reduction record may indicate, different resources for uplink communications and downlink communications. At times, maintaining non-D2D communications may be prioritized over improved D2D communications, for example, a frequency band configuration may be used which has minimal effect on non-D2D communications or capabilities, while still allowing for adequate (through potentially non-ideal) D2D communications.

In some examples, the reduced capability configuration for non-D2D communications may be associated with D2D resource pools, e.g., a type 1 discovery resource pool and/or a mode 2 communication resource pool. In this examples, the UE may pause or otherwise interrupt uplink and/or downlink non-D2D communications with the eNB for one subframe, for example, before and after accessing the D2D resource pools to conduct RF tuning operations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like. A UE 115 may also be able to communicate with other UEs either within or outside the same coverage area of a base station via D2D communications, e.g., for proximity service communication functions. A UE 115 may be able to communicate with other UEs via an air interface that carries proximity service application codes for direction discovery and proximity service encapsulated internet protocol (IP) packets for direct communications. Similarly, a UE 115 may be able to communication with a proximity service function via an IP reference point protocol to distribute an authorization policy for direct discovery and perform allocation/resolution of codes corresponding to proximity service application identities used for direct discovery.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support signaling D2D proximity service communications capabilities and/or an indication of reduced non-D2D communication capabilities based on supported D2D proximity service communications. A UE 115 may determine one or more frequency bands that it supports for D2D proximity service communications. The UE may determine, based on the supported D2D frequency bands, a proximity service record for a frequency band combination parameter. The frequency band combination parameter may be associated with a combination of frequency bands used for CA communications or other non-D2D related communication techniques. The proximity service record may include, for the supported D2D frequency bands, a configuration capability for the frequency band combination for active D2D proximity service communications.

A base station 105 may receive an indication of the proximity service record for a frequency band combination associated with non-D2D communications. Based on the indication, the base station 105 may determine a capability configuration for non-D2D communications for the UE. The capability configuration may include a capability reduction record that provides an indication of reduced non-D2D communication capability when at least one of the D2D frequency bands are being utilized for D2D proximity service communications. The base station 105 may, based on the capability reduction record determine what non-D2D communication capabilities the UE 115 can support while engaged in D2D proximity service communications.

Figure 2:
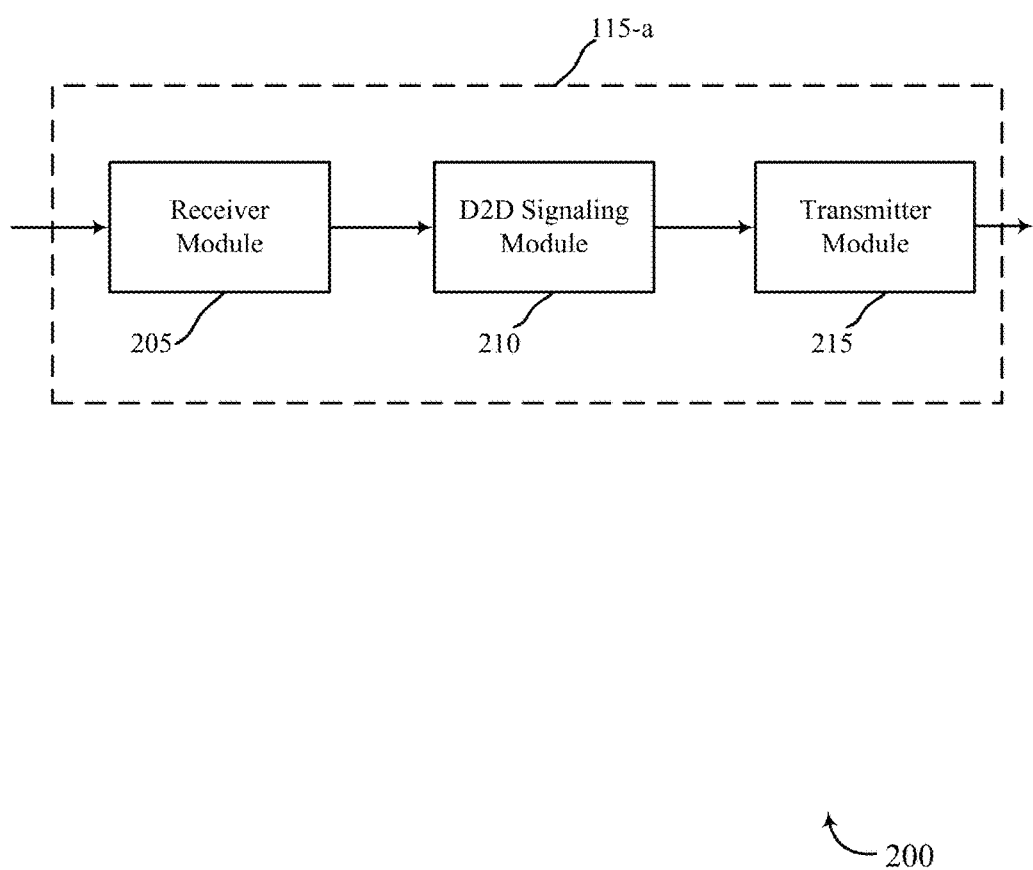
FIG. 2 shows a block diagram of a device configured for use in wireless communication, in accordance with various aspects of the present disclosure.

FIG. 2 shows a block diagram 200 of a device 115-a for use in wireless communication, in accordance with various aspects of the present disclosure. The device 115-a may be an example of one or more aspects of a UE 115 described with reference to FIG. 1. The device 115-a may include a receiver module 205, a D2D signaling module 210, and/or a transmitter module 215. The device 115-*a* may also be or include a processor (not shown). Each of these modules may be in communication with each other.

The components of the device 115-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a serving base station including information associated with D2D proximity service communications, non-D2D communications, resource assignments, etc. The receiver module 205 may also receive signals from an different UE, via D2D communications, that include information or are otherwise associated with proximity service communications, e.g., discovery signals, communications, etc. Information may be passed on to the D2D signaling module 210, and to other components of the device 115-*a*.

The D2D signaling module 210 may manage D2D proximity service communication signaling for the device 115-*a*. The D2D signaling module 210 may identify frequency bands supported for D2D proximity service communications. The D2D frequency bands may be utilized for direct D2D communications to perform proximity service functions. The D2D signaling module 210 may, based on the identified D2D frequency bands, determine a proximity service record for a frequency band combination parameter. The frequency band combination parameter may be associated with a combination of frequency bands used for non-D2D communications, e.g., CA communications. The proximity service record may indicate, for the D2D frequency bands, a reduced non-D2D communication capability configuration for non-D2D communications. For example, the proximity service record may indicate if, and what multi-carrier non-D2D communication functions are available when D2D proximity service communications are active. The D2D signaling module 210 may also determine a proximity service capability record that includes information identifying the D2D frequency bands and other D2D proximity service communication parameters. The D2D signaling module 210 may send, via the transmitter module 215, a message to the serving cell including information indicative of the D2D proximity service communication capabilities and the reduced capability configuration for non-D2D communications.

The transmitter module 215 may transmit the one or more signals received from other components of the device 115-*a*. The transmitter module 215 may transmit information such as packets, user data, and/or control information to a serving cell. The transmitter module 215 may send messages to the serving cell in conjunction with D2D capabilities signaling operations. The transmitter module 215 may also send signals to a different UE via D2D communications for proximity service communications. In some examples, the transmitter module 215 may be collocated with the receiver module 205 in a transceiver module.

Figure 3:
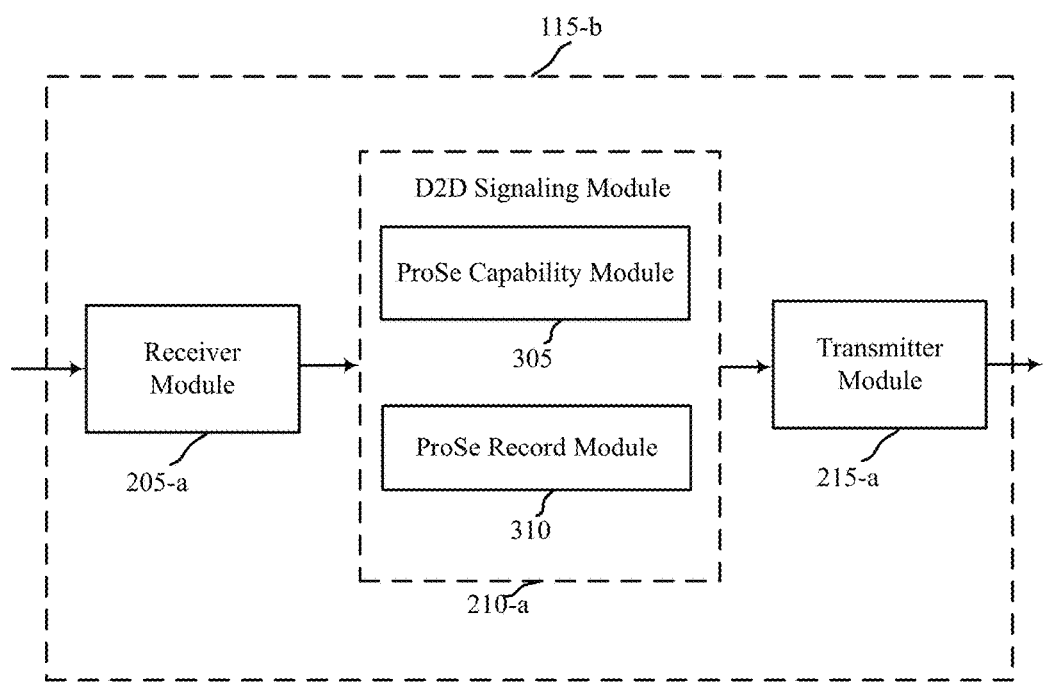
FIG. 3 shows a block diagram of a device configured for use in wireless communication, in accordance with various aspects of the present disclosure.

FIG. 3 shows a block diagram 300 of a device 115-*b* for use in wireless communication, in accordance with various examples. The device 115-*b* may be an example of one or more aspects of a UE 115 described with reference to FIG. 1. It may also be an example of a device 115-*a* described with reference to FIG. 2. The device 115-*b* may include a receiver module 205-*a*, a D2D signaling module 210-*a*, and/or a transmitter module 215-*a*, which may be examples of the corresponding modules of device 115-*a*. The device 115-*b* may also include a processor (not shown). Each of these components may be in communication with each other. The D2D signaling module 210-*a* may include a proximity service (ProSe) capability module 305, and a proximity service record module 310. The receiver module 205-*a* and the transmitter module 215-*a* may perform the functions of the receiver module 205 and the transmitter module 215, of FIG. 2, respectively.

The components of the device 115-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The proximity service capability module 305 may manage aspects of proximity service capability identification and management for the device 115-*b*. The proximity service capability module 305 may identify frequency bands supported by D2D proximity service communications by the device 115-*b*. The D2D frequency bands may be assigned to the device 115-*b* by a carrier, for example, and stored in a memory of the device 115-*b*. The proximity service capability module 305 may also determine additional operation parameters supported for D2D proximity service communications by the device 115-*b*. The proximity service capability module 305 may output information indicative of the supported D2D frequency bands and/or the configuration parameters for D2D proximity service communications.

The proximity service record module 310 may manage aspects of determining and communicating a proximity service record for the device 115-*b*. For example, the proximity service record module 310 may, in cooperation with the proximity service capability module 305, determine the proximity service record for a frequency band combination parameter for the device 115-*b*. The frequency band combination parameter may be associated with a combination of frequency bands used for non-D2D communications, e.g., for CA or other multi-carrier communications. The proximity service record may include information indicative of an impact on the non-D2D communication capability configuration based on the D2D frequency bands. As one example, the receiver module 205-*a* may comprise a plurality of receiver chains to support CA communications. The proximity service record may include an indication that, when D2D proximity service communications are active on one of the D2D frequency bands, at least one of the receiver chains would be unavailable for non-D2D communications and, therefore, the device 115-*b* may not be capable of supporting full non-D2D communications. Accordingly, the proximity service record may provide a configuration capability for reduced non-D2D communications when considering D2D proximity service communications.

In some examples, the proximity service record module 310 may determine a proximity service record for the supported frequency band combinations and for the supported D2D frequency bands. Accordingly, the device 115-b may provide a full permutation of reduced non-D2D communication capabilities. The proximity service record module 310 may provide the noted information when the device 115-b first powers up and/or otherwise initially registers with a carrier network.

Figure 4:
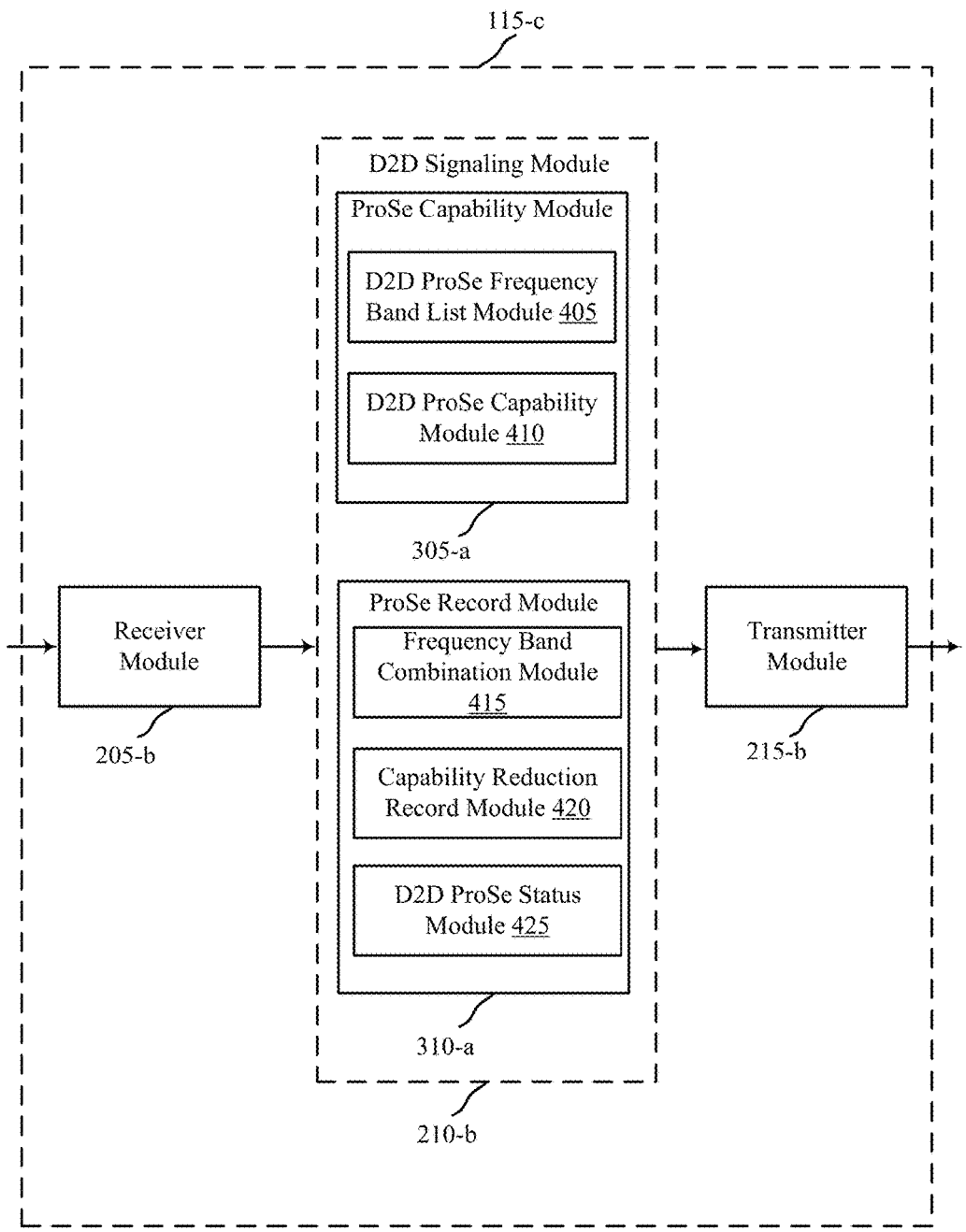
FIG. 4 shows a block diagram of a device configured for use in wireless communication, in accordance with various aspects of the present disclosure.

FIG. 4 shows a block diagram 400 of a device 115-c for use in wireless communication, in accordance with various examples. The device 115-c may be an example of one or more aspects of a UE 115 described with reference to FIG. 1. It may also be an example of a device 115-a and/or 115-b described with reference to FIGS. 2 and 3. The device 115-c may include a receiver module 205-b, a D2D signaling module 210-b, and/or a transmitter module 215-b, which may be examples of the corresponding modules of devices 115-a and/or 115-b. The device 115-c may also include a processor (not shown). Each of these components may be in communication with each other. The D2D signaling module 210-b may include a proximity service (ProSe) capability module 305-a, and a proximity service record module 310-a. The receiver module 205-b and the transmitter module 215-b may perform the functions of the receiver module 205 and the transmitter module 215, of FIG. 2, respectively.

The components of the device 115-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The proximity service capability module 305-a may include a D2D proximity service frequency band list module 405 and a D2D proximity service capability module 410 and may manage aspects of proximity service capability identification and management for the device 115-c. The D2D proximity service frequency band list module 405 may identify frequency bands supported by D2D proximity service communications by the device 115-c. The D2D frequency bands may be assigned to the device 115-c by a carrier, for example, and stored in a memory of the device 115-c. For the supported D2D frequency bands, the D2D proximity service frequency band list module 405 may output information indicative of the frequency band parameters. For example, the D2D proximity service frequency band list module 405 may output a proximity service frequency band list. The D2D proximity service frequency band list module 405 may, in cooperation with the transmitter module 215-b, send a proximity service capability record that includes the frequency band list.

The D2D proximity service capability module 405 may determine additional operation parameters supported for D2D proximity service communications by the device 115-c. For example, the D2D proximity service capability module 405 may determine proximity service communication parameters associated with D2D proximity service communications for the device 115-c. Example proximity service communication parameters include, but are not limited to, a D2D discovery type capability (e.g., discovery resources type 1 and/or type 2), an asynchronous D2D discovery capability, an out-of-coverage discovery capability, a D2D communication mode capability (e.g., communication mode 1 and/or mode 2), or any combination thereof. The D2D proximity service capability module 410 may output information indicative of the proximity service communication parameters. In some examples, some or all of the proximity service communication parameters may be included in the proximity service capability record, along with the frequency band list.

The proximity service record module 310-a may include a frequency band combination module 415, a capability reduction record module 420, and a D2D proximity service status module 425 and may manage aspects of determining and communicating a proximity service record for the device 115-c. The device 115-c may support multi-carrier communications, e.g., CA communications, using a range of available frequency band combinations for non-D2D communications. The frequency band combination module 415 may determine, for the available combinations and/or iteration of carriers, a frequency band combination, e.g., a frequency band combination for frequency bands 1 and 2, for frequency bands 1, 2, and 3, for frequency bands 1 and 3, and so forth. Accordingly, the UE 115-c may know which frequency band combinations it supports for non-D2D CA communications. The frequency band combination module 415 may output information indicative of the supported frequency band combinations.

The capability reduction record module 420 may, for the frequency band combinations supported by the device 115-c, determine a first capability configuration. The first capability configuration may include information associated with full operational characteristics of the frequency band combinations, e.g., supported bands, band parameters, etc. The capability reduction record module 420 may also determine, based on the supported D2D frequency bands and for the frequency band combinations, a second capability configuration. The second capability configuration may consider the reduced non-D2D communication capabilities when D2D proximity service communications are active via one of the supported D2D frequency bands. Accordingly, the capability reduction record module 420 may output a capability reduction record for the frequency band combinations. The capability reduction record may include information indicating, for the supported D2D frequency bands, a reduced non-D2D communication capability if the D2D frequency band is active.

In some examples, the reduced capability record may include information for when the device 115-c is transmitting for D2D proximity service communications, whether the device 115-c can support simultaneous transmission for non-D2D communications (e.g., WAN communications), can support intra-band uplink bandwidth class reduction, can support simultaneous reception for non-D2D communications, can support measurement operations, or a combination thereof. In some examples, the reduced capability record may include information for when the device 115-c is receiving for D2D proximity service communications, whether the device 115-c can support simultaneous reception for non-D2D communications, can support intra-band downlink bandwidth class reduction, can support simultaneous transmission for non-D2D communications, can support measurement operations, or a combination thereof.

The D2D proximity service status module 425 may manage aspects related to monitoring and communicating the status of D2D proximity service communications. For example, the D2D proximity service status module 425 may send, via the transmitter module 215-b, a start message and/or a stop message indicating when D2D proximity service communications are active or inactive, respectively, for the device 115-c. The D2D proximity service status module 425 may, in cooperation with the capability reduction record module 420, determine and include in the start message an updated proximity service record for the frequency band combination parameter. The updated proximity service record may consider and account for the D2D frequency bands being in use for the active D2D proximity service communications. Correspondingly, the D2D proximity service status module 425 may, in cooperation with the capability reduction record module 420, determine and include in the stop message an updated proximity service record for the frequency band combination parameter. The updated proximity service record may consider and account for the D2D frequency bands no longer being in use for the active D2D proximity service communications and, therefore, provide for full non-D2D communication capabilities. Accordingly, the D2D proximity service status module 425, alone or in combination with other module(s), may determine a reduced capability for non-D2D communications when D2D proximity service communications are active and/or a full capability for non-D2D communications when D2D proximity service communications are inactive.

In some examples, the D2D proximity service status module 425 may receive, via the receiver module 205-b, a response to the start message from the eNB. The response may be, in some examples, an RRC connection reconfiguration message that indicates the reduced capabilities configuration for non-D2D communications. The D2D proximity service status module 425, alone or in combination with other modules of the device 115-c, may pause non-D2D communications (uplink and/or downlink) with the eNB for one subframe, for example, during the RRC connection reconfiguration procedure to conduct RF tuning operations.

Figure 5:
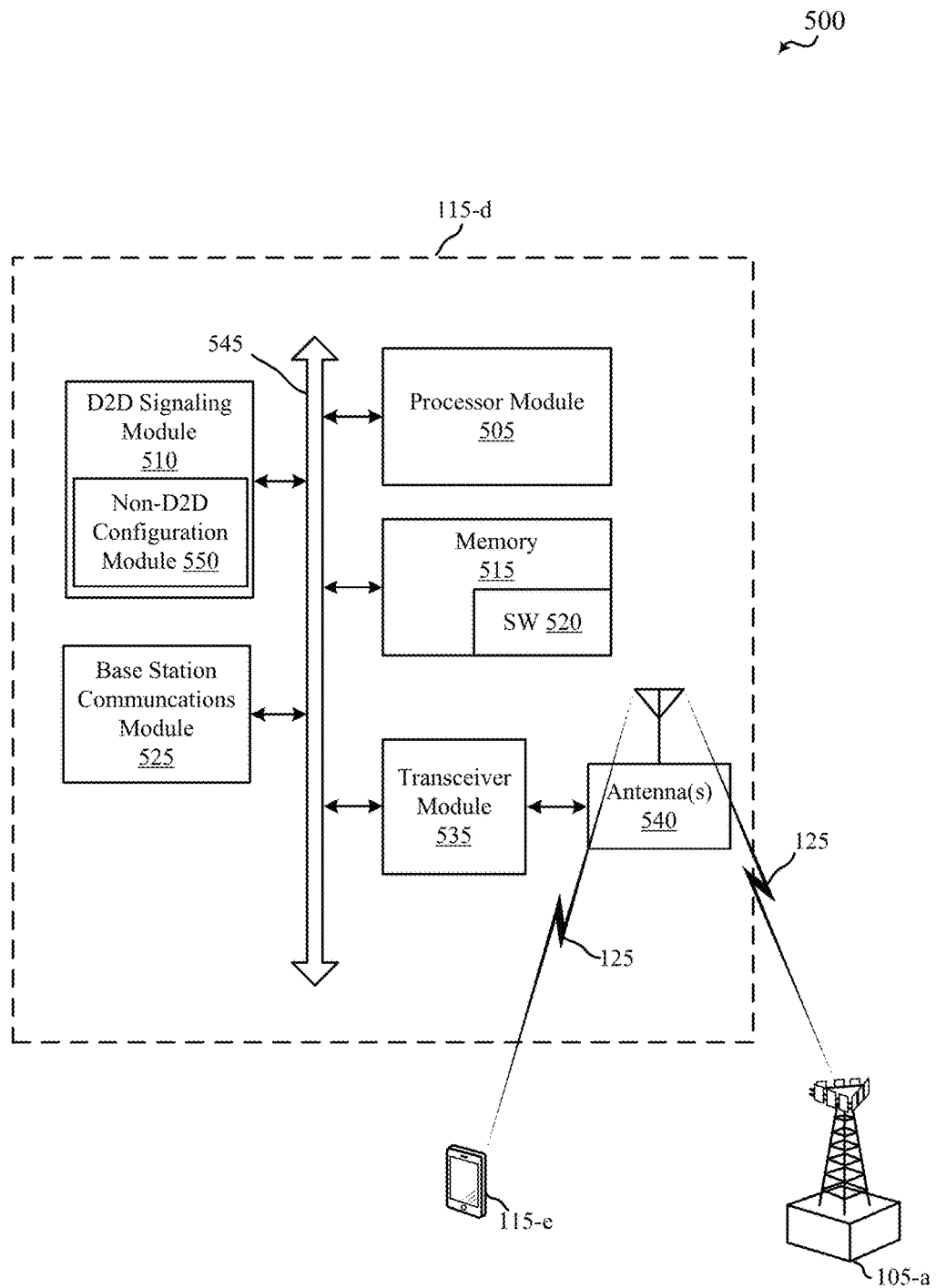
FIG. 5 shows a block diagram of a wireless communication system, in accordance with various aspects of the present disclosure.

FIG. 5 shows a system 500 for use in wireless communication, in accordance with various examples. System 500 may include a UE 115-d, which may be an example of the UEs 115 of FIG. 1. UE 115-d may also be an example of one or more aspects of devices 115 of FIGS. 2, 3, and/or 4.

The UE 115-d may generally include components for bi-directional voice and data communications including components for transmitting communications and components for receiving communications. The UE 115-d may include antenna(s) 540, a transceiver module 535, a processor module 505, and memory 515 (including software (SW) 520), which each may communicate, directly or indirectly, with each other (e.g., via one or more buses 545). The transceiver module 535 may communicate bi-directionally, via the antenna(s) 540 and/or one or more wired or wireless links, with one or more networks, as described above. For example, the transceiver module 535 may communicate bi-directionally with base stations 105, with other UEs 115, and/or with devices 115 with reference to FIG. 1, 2, 3, or 4. The transceiver module 535 may include a modem to modulate the packets and provide the modulated packets to the antenna(s) 540 for transmission, and to demodulate packets received from the antenna(s) 540. While the UE 115-d may include a single antenna 540, the UE 115-d may have multiple antennas 540 capable of concurrently transmitting and/or receiving multiple wireless transmissions via carrier aggregation techniques, for example. The transceiver module 535 may be capable of concurrently communicating with one or more base stations 105 via multiple component carriers.

The UE 115-d may include a D2D signaling module 510, which may perform the functions described above for the D2D signaling module 210 of devices 115 of FIGS. 2, 3, and/or 4. The UE 115-d may also include a non-D2D configuration module 550. The non-D2D configuration module 550 may determine, monitor, control, and/or otherwise manage aspects of non-D2D communication operations for the UE 115-d. The non-D2D configuration module 550 may, based on identified frequency bands supported for D2D proximity service communications, a proximity service record for frequency band combinations. The frequency band combinations may indicate frequency band combinations for CA communications for the device 115-d. The proximity service record may indicate a reduced capability, for the supported D2D frequency bands and for the frequency band combinations, for non-D2D communications when D2D proximity service communications are active. Accordingly, the device 115-d may signal its D2D capability information along with any impacts on non-D2D communications based on active D2D proximity service communications.

The memory 515 may include random access memory (RAM) and read-only memory (ROM). The memory 515 may store computer-readable, computer-executable software/firmware code 520 containing instructions that, when executed, cause the processor module 505 to perform various functions described herein (e.g., identify supported D2D frequency bands, determine proximity service record for the frequency band combinations, etc.). Alternatively, the computer-readable, computer-executable software/firmware code 520 may not be directly executable by the processor module 505 but cause a computer (e.g., when compiled and executed) to perform functions described herein. The processor module 505 may include an intelligent hardware device, e.g., a central processing unit (CPU), a microcontroller, an application-specific integrated circuit (ASIC), etc.

Figure 6:
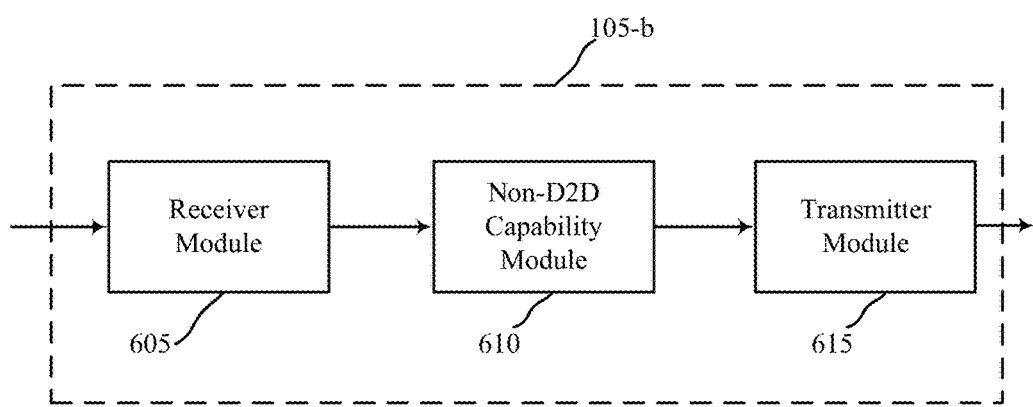
FIG. 6 shows a block diagram of an apparatus for use in wireless communication, in accordance with various aspects of the present disclosure.

FIG. 6 shows a block diagram 600 of an apparatus 105-b for use in wireless communication, in accordance with various aspects of the present disclosure. In some examples, the apparatus 105-b may be an example of aspects of one or more of the base stations 105 described with reference to FIG. 1, 2, 3, or 4. In some examples, the apparatus 105-b may be part or include an LTE/LTE-A eNB and/or an LTE/LTE-A base station. The apparatus 105-b may also be a processor. The apparatus 105-b may include a receiver module 605, a non-D2D capability module 610, and/or a transmitter module 615. Each of these modules may be in communication with each other.

The components of the apparatus 105-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 605 may include at least one radio frequency (RF) receiver, such as an RF receiver operable to receive D2D proximity service communication capability information and/or an indication of reduced/restored configuration capabilities for non-D2D communications, etc. The receiver module 605 may be used to receive various types of data and/or control signals (i.e., transmissions) over one or more communication links of a wireless communication system, such as one or more communication links of the wireless communications system 100 described with reference to FIG. 1.

In some examples, the transmitter module 615 may include at least one RF transmitter, such as at least one RF transmitter operable to transmit D2D proximity service communication related signals to UEs, transmit non-D2D communications, etc. The transmitter module 615 may be used to transmit various types of data and/or control signals (i.e., transmissions) over one or more communication links of a wireless communication system, such as one or more communication links of the wireless communications system 100 described with reference to FIG. 1.

In some examples, the non-D2D capability module 610 may receive, monitor, and/or manage one or more functions for non-D2D communications for UEs. The non-D2D capability module 610 may receive an indication of a proximity service record for a frequency band combination parameter. The frequency band combination parameter may indicate a combination of frequency bands associated with non-D2D communications for a UE. The non-D2D capability module 610 may receive the indication from the UE during initial carrier registration, power on, etc., and/or from a network entity (e.g., a mobility management entity) for a previously registered UE. The proximity service record may include a capability reduction record for the frequency band combination parameter. In some examples, the frequency band combinations may include a proximity service record. In some examples, the proximity service record may include, for the D2D frequency bands the UE supports, an indication of the impact or reduction in non-D2D communication capabilities when the D2D frequency band is active. Accordingly, the non-D2D capability module 610 may manage one or more aspects relating to non-D2D communications when the UE is actively communicating via D2D proximity service communications.

Figure 7:
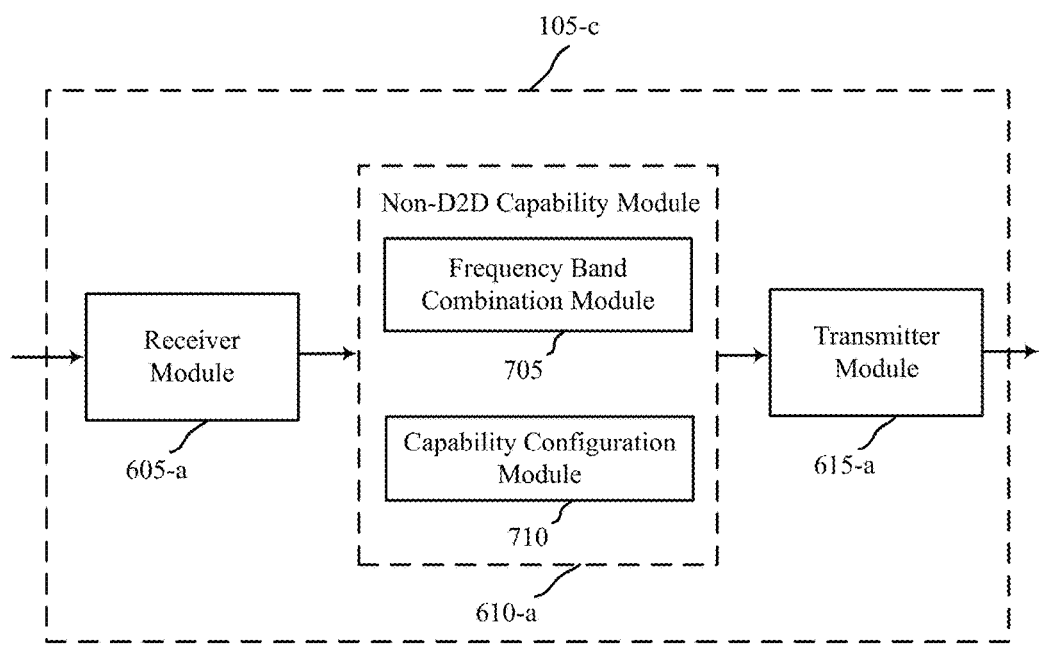
FIG. 7 shows a block diagram of an apparatus for use in wireless communication, in accordance with various aspects of the present disclosure.

FIG. 7 shows a block diagram 700 of an apparatus 105-c for use in wireless communication, in accordance with various aspects of the present disclosure. In some examples, the apparatus 105-c may be an example of aspects of one or more of the base stations 105 described with reference to FIG. 1, 2, 3, 4, or 5, and/or an example of aspects of the apparatus 105-b described with reference to FIG. 6. In some examples, the apparatus 105-c may be part or include an LTE/LTE-A eNB and/or an LTE/LTE-A base station. The apparatus 105-c may also be a processor. The apparatus 105-c may include a receiver module 605-a, a non-D2D capability module 610-a, and/or a transmitter module 615-a. Each of these modules may be in communication with each other. The non-D2D capability module 610-a may include a frequency band combination module 705 and a capability configuration module 710. The receiver module 605-a and the transmitter module 615-a may perform the functions of the receiver module 605 and the transmitter module 615 of FIG. 6, respectively.

The components of the apparatus 105-c may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the frequency band combination module 705 may manage various functions for combinations of frequency bands associated with non-D2D communications. The frequency band combination module 705 may receiver, determine, identify, etc., a proximity service record for a frequency band combination parameter associated with non-D2D communications for a UE. The proximity service record may include a capability reduction record for the frequency band combination. The capability reduction record may include information indicative of a reduced non-D2D communication capability when a D2D frequency band associated with D2D proximity service communications is active.

In some examples, the capability reduction record may include information indicative of, when the UE is transmitting in a D2D proximity service communication frequency band, whether the UE can support simultaneous non-D2D communication transmission (e.g., WAN communications), can support contiguous intra-band uplink bandwidth class reduction, can support simultaneous non-D2D reception, can support measurement operations, or combinations thereof. As another example, the capability reduction record may include information indicative of, when the UE is receiving on a D2D proximity service communication frequency band, whether the UE can support simultaneous non-D2D communication reception, can support contiguous intra-band downlink bandwidth class reduction, can support simultaneous non-D2D transmission, can support measurement operations, or combinations thereof.

In some examples, the frequency band combination module 705 may also receive or otherwise determine a proximity service capabilities record for the UE. The proximity service capabilities record may include information indicative of the D2D frequency bands supported by the UE for D2D proximity service communications and/or D2D proximity service communication capabilities information. Accordingly, the frequency band combination module 705 may also determine various D2D proximity service communication capabilities supported by the UE.

In some examples, the capability configuration module 710 may determine, based on the proximity service record, a capability configuration for non-D2D communications for the UE. The capability configuration may include a first capability configuration associated with full non-D2D communication capabilities for the UE. The capability configuration may include a second capability configuration associated with reduced non-D2D communication capabilities for the UE, e.g., a reduced capabilities record. The reduced capabilities record may indicate, when a supported D2D frequency band is being used for D2D proximity service communications, the reduced capabilities for non-D2D communications, e.g., a transmit and/or receive chain of the UE has been reassigned for D2D communications.

In some examples, the capability configuration module 710 may, alone or in combination with other module(s) of the apparatus 105-c, receive a start message and/or a stop message from the UE indicating when D2D proximity service communications are active or inactive, respectively, for the UE. The capability configuration module 710 may determine, based on information included in the start message, an updated proximity service record for the frequency band combination parameter. The updated proximity service record may consider and account for the D2D frequency bands being in use for the active D2D proximity service communications. Correspondingly, the capability configuration module 710 may determine, based on information included in the stop message, an updated proximity service record for the frequency band combination parameter. The updated proximity service record may consider and account for the D2D frequency bands no longer being in use for the active D2D proximity service communications and, therefore, provide for full non-D2D communication capabilities.

In some examples, the capability configuration module 710 may send, via the transmitter module 615-*a*, a message to the UE indicating aspects of the reduced capabilities for non-D2D communications. The message may be sent in response to receiving the start message. In some aspects, the reduced capability configuration determined by the capability configuration module 710 may be signaled to the UE via an RRC connection reconfiguration message. The RRC connection reconfiguration message may include an indication of resources assigned to the UE considering the reduced capability configuration associated with being in an active D2D proximity service communication state.

In some examples, the reduced capability configuration for non-D2D communications may be applicable when the apparatus 105-*c* has assigned a pool of resources for D2D proximity service communications, e.g., type 1 discovery resource pool and/or mode 2 communication resource pool. In this example, a full capability configuration for non-D2D communications may be determined when the resources are accessed via assignment from the apparatus 105-*c*. For example, the apparatus 105-*c* may receive the start message (e.g., the start message may include a request for resources for D2D proximity service communications) and schedule resources for the UE based on the UEs capabilities (e.g., resource chain(s), transmit chain(s), etc.) and the active D2D communications.

In some examples, the frequency band combination module 705 and/or the capability configuration module 710 may, based on the proximity service record, schedule (or refrain from scheduling) one or more resources for the UE. For example, when D2D proximity service communications are active for the UE, the apparatus 105-*c* may refrain from scheduling resources for non-D2D communications because the UE may not be able to support full non-D2D communication capabilities. Similarly, when D2D proximity service communications are inactive for the UE, the apparatus 105-*c* may know that it is permissible to schedule resources for non-D2D communications.

Figure 8:
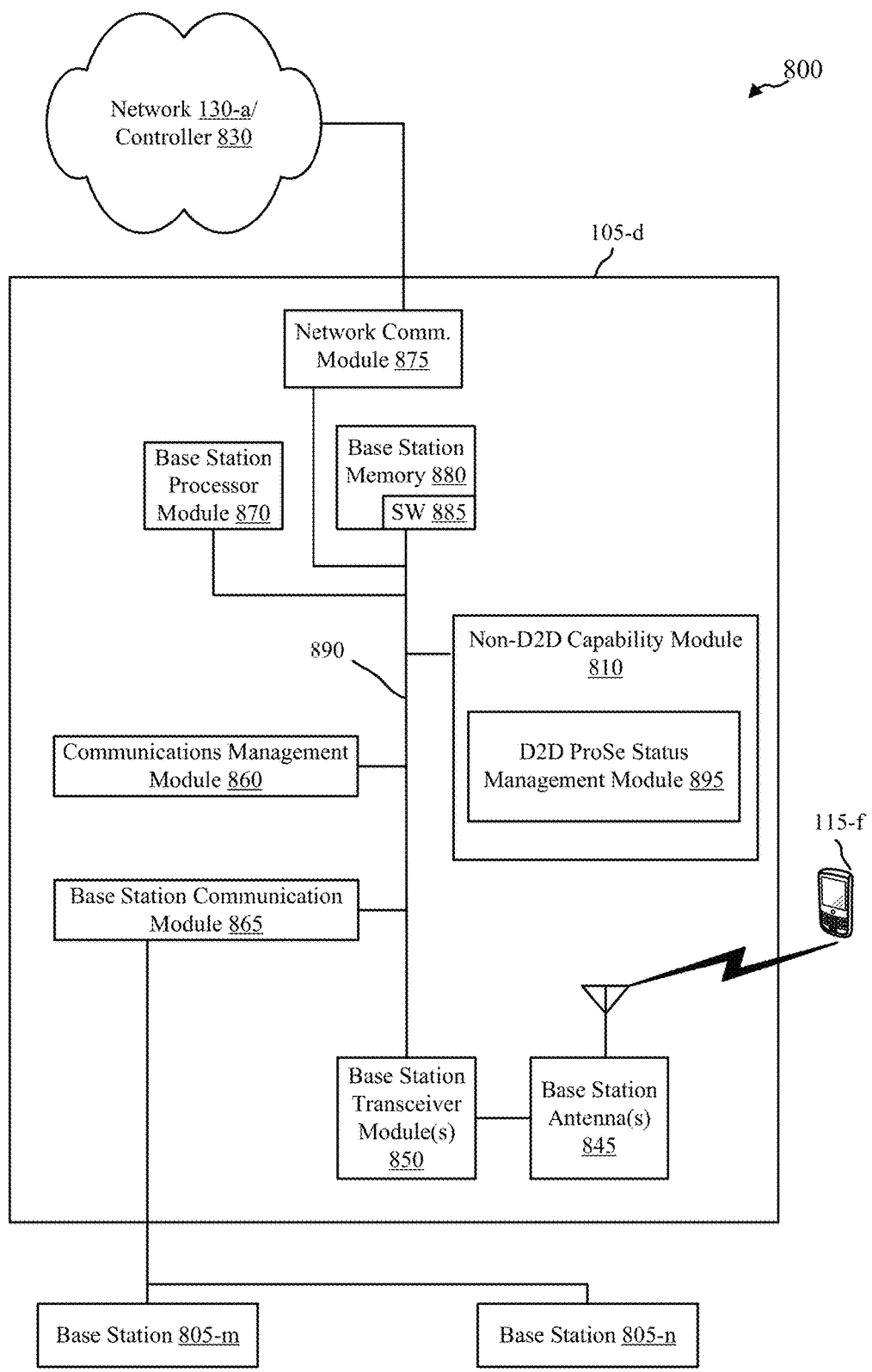
FIG. 8 shows a block diagram of a base station (e.g., a base station forming part or all of an eNB) for use in wireless communication, in accordance with various aspects of the present disclosure.

FIG. 8 shows a block diagram 800 of a base station 105-*d* (e.g., a base station forming part or all of an eNB) for use in wireless communication, in accordance with various aspects of the present disclosure. In some examples, the base station 105-*d* may be an example of aspects of one or more of the base stations 105 described with reference to FIG. 1, 2, 3, 4, or 5, and/or aspects of one or more of the apparatus 105 described with reference to FIG. 6 or 7 when configured as a base station. The base station 105-*d* may implement or facilitate at least some of the base station and/or apparatus features and functions described with reference to FIG. 1, 2, 3, 4, 5, 6, or 7.

The base station 105-*d* may include a base station processor module 870, a base station memory module 880, at least one base station transceiver module (represented by base station transceiver module(s) 850), at least one base station antenna (represented by base station antenna(s) 845), and/or a non-D2D capability module 810. The base station 105-*d* may also include one or more of a base station communications module 865 and/or a network communications module 875. Each of these modules may be in communication with each other, directly or indirectly, over one or more buses 890.

The base station memory module 880 may include random access memory (RAM) and/or read-only memory (ROM). The base station memory module 880 may store computer-readable, computer-executable software/firmware code 885 containing instructions that, when executed, cause the base station processor module 870 to perform various functions described herein related to wireless communication (e.g., receive proximity service record for frequency band combination, determine capability configuration for non-D2D communications, etc.). Alternatively, the computer-readable, computer-executable software/firmware code 885 may not be directly executable by the base station processor module 870 but cause the base station 105-*d* (e.g., when compiled and executed) to perform various of the functions described herein.

The base station processor module 870 may include an intelligent hardware device, e.g., a central processing unit (CPU), a microcontroller, an ASIC, etc. The base station processor module 870 may process information received through the base station transceiver module(s) 850, the base station communications module 865, and/or the network communications module 875. The base station processor module 870 may also process information to be sent to the transceiver module(s) 850 for transmission through the antenna(s) 845, to the base station communications module 865, for transmission to one or more other base stations 805-*m* and 805-*n*, and/or to the network communications module 875 for transmission to a core network 830, which may be an example of one or more aspects of the core network 130 described with reference to FIG. 1. The base station processor module 870 may handle, alone or in connection with the non-D2D capability module 810, various aspects of D2D capability signaling operations for UEs participating in D2D proximity service communication operations.

The base station transceiver module(s) 850 may include a modem to modulate packets and provide the modulated packets to the base station antenna(s) 845 for transmission, and to demodulate packets received from the base station antenna(s) 845. The base station transceiver module(s) 850 may, in some examples, be implemented as one or more base station transmitter modules and one or more separate base station receiver modules. The base station transceiver module(s) 850 may support communications in a first radio frequency spectrum band and/or a second radio frequency spectrum band. The base station transceiver module(s) 850 may communicate bi-directionally, via the antenna(s) 845, with one or more UEs or apparatuses, such as one or more of the UEs 115 described with reference to FIG. 1, 2, 3, 4, 5, or 6. The base station 105-*d* may, for example, include multiple base station antennas 845 (e.g., an antenna array). The base station 105-*d* may communicate with the core network 130-*a* through the network communications module 875. The base station 105-*d* may also communicate with other base stations, such as the base stations 805-*m* and 805-*n*, using the base station communications module 865.

The non-D2D capability module 810 may perform and/or control some or all of the features and/or functions described with reference to FIG. 6 or 7 related to capability determination operations, e.g., D2D proximity service communication capabilities and non-D2D capabilities configurations. The non-D2D capability module 810 may include a D2D proximity service status management module 895 that performs some or all of the features and/or functions of the barring management module 795. In some examples, the D2D proximity service status management module 895 may receive a start and/or stop message from a UE engaged in active D2D proximity service communications. In some examples, the start/stop message may include an updated proximity service record indicating the reduced capabilities record for a frequency band combination while D2D communications are active or indicating that full non-D2D communications are active due to D2D communications being inactive. The non-D2D capability module 810, or portions of the module 810, may include a processor, and/or some or all of the functions of the non-D2D capability module 810 may be performed by the base station processor module 870 and/or in connection with the base station processor module 870. In some examples, the non-D2D capability module 810 may be an example of the non-D2D capability module 610 and/or 610-*a* described with reference to FIGS. 6 and/or 7.

Figure 9:
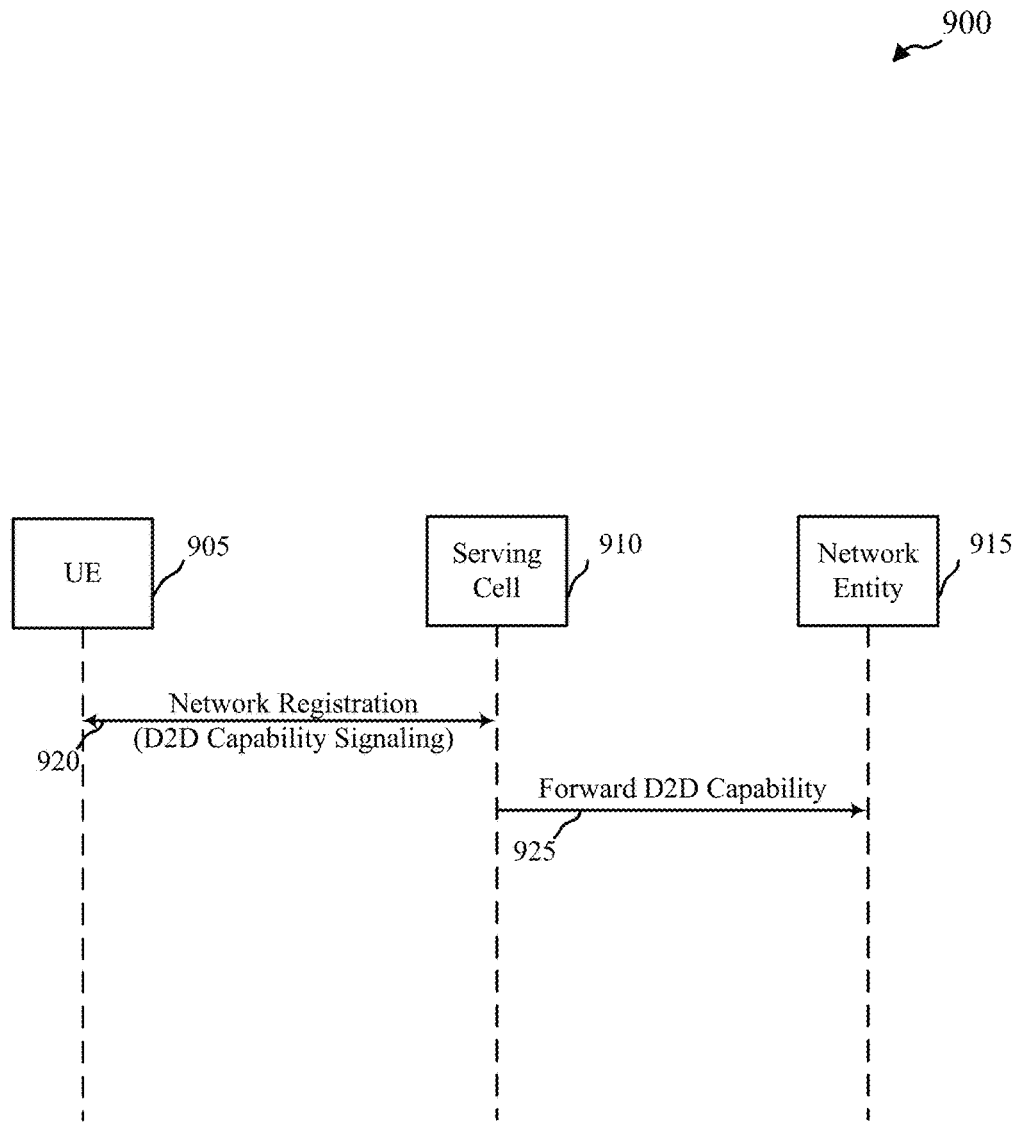
FIG. 9 shows a swim diagram illustrating aspects of D2D capability signaling, in accordance with various aspects of the present disclosure.

FIG. 9 is a swim diagram 900 illustrating aspects of D2D capability signaling, in accordance with various aspects of the present disclosure. The diagram 900 may illustrate aspects of the system 100, 500 and/or 800 described with reference to FIG. 1, 5, or 8, respectively. The diagram 900 includes a UE 905, a serving cell 910, and a network entity 915. The UE 905 may be an example of one or more of the UEs 115 and/or devices 115 described above with respect to FIGS. 1, 2, 3, 4, and/or 5. The serving cell 910 may be an example of one or more of the base stations 105 and/or apparatuses 105 described above with respect to FIGS. 1, 6, 7, and/or 8. Generally, the diagram 900 illustrates aspects of implementing D2D capability signaling. In some examples, a system device, such as one of the UEs 115 and/or base stations 105 may execute one or more sets of codes to control the functional elements of the device to perform some or all of the functions described below.

At block 920, the UE 905 registers with a network by exchanging one or more messages with the serving cell 910. For example, the UE 905 may register with the network, via the serving cell, when the UE is first powered on, when an airplane mode is turned off, etc. During the network registration process, the UE sends D2D capability signaling to the serving cell 910. The D2D capability information may include a proximity service record for a frequency band combination and, in some examples, a proximity service capability record. In some examples, the proximity service record may be included for the frequency band combinations the UE 905 supports for non-D2D communications, e.g., CA communications. For the proximity service records, a capability reduction record may be included for the supported D2D frequency bands that conveys information associated with a reduction in non-D2D communication capability when D2D communications are active. The proximity service capability record may include the frequency band list of frequency bands supported for D2D proximity service communications as well as other D2D proximity service communications supported configurations.

At block 925, the serving cell 910 may forward the D2D capability information for the UE 905 to the network entity 915. The network entity 915 may be a mobility management entity (MME), for example, and may store the D2D capability information for the UE 905. In some examples, the network entity 915 and/or the serving cell 910 may send the D2D capability information for the UE 905 to a target cell during a handover or cell reselection procedure. Accordingly, the serving cell 910 and/or future target cells may know the impact active D2D proximity service communications may have on supported non-D2D communications due to finite resources of the UE 905.

Figure 10:
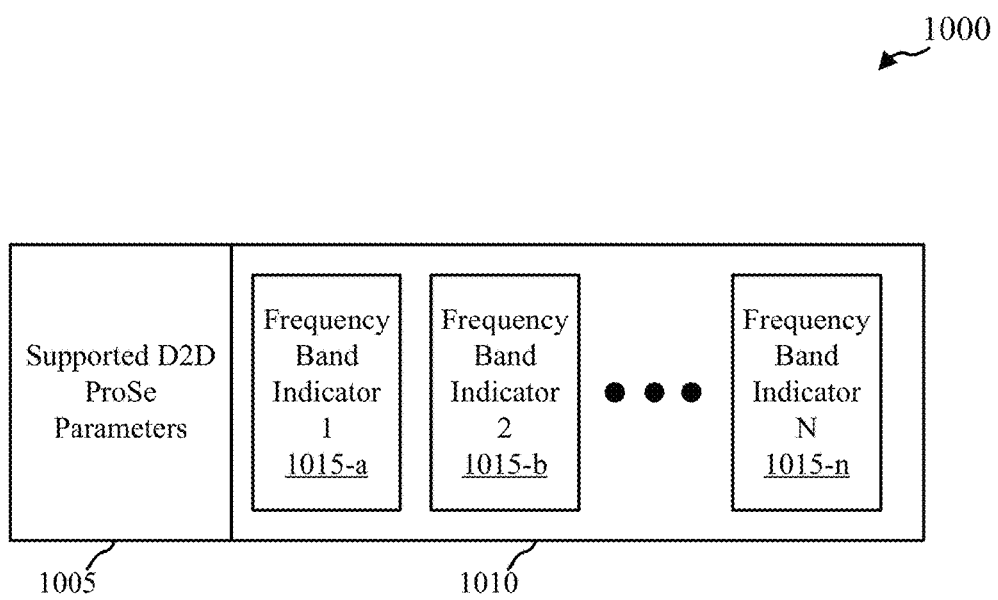
FIG. 10 shows a diagram illustrating aspects of a D2D proximity service capability record, in accordance with various aspects of the present disclosure.

FIG. 10 is a diagram 1000 illustrating aspects of a D2D proximity service capability record, in accordance with various aspects of the present disclosure. The diagram 1000 may illustrate aspects of the system 100, 500 and/or 800 described with reference to FIG. 1, 5, or 8, respectively. The diagram 1000 may be implemented by one or more of the UEs 115 and/or devices 115 described above with respect to FIGS. 1, 2, 3, 4, and/or 5. In some examples, a system device, such as one of the UEs 115 and/or base stations 105 may execute one or more sets of codes to control the functional elements of the device to perform some or all of the functions described below.

The diagram 1000 may include a proximity service capability record 1005 and a supported frequency band list 1010. The proximity service capability record 1005 may include information associated with performing D2D proximity service communications. For example, the proximity service capability record 1005 may include proximity service communication parameters for D2D proximity service communications, e.g., a D2D discovery type capability, an asynchronous D2D discovery capability, an out-of-coverage discovery capability, a D2D communication mode capability, or a combination thereof.

The supported frequency band list 1010 includes a frequency band list associated with frequency bands supported for D2D proximity service communications. The frequency band list may indicate the supported D2D frequency bands 1015 and include one or more frequency band parameters. In some examples, the frequency band list 1010 may include a record for the D2D frequency bands 1015 a UE supports for D2D proximity service communications.

Figure 11:
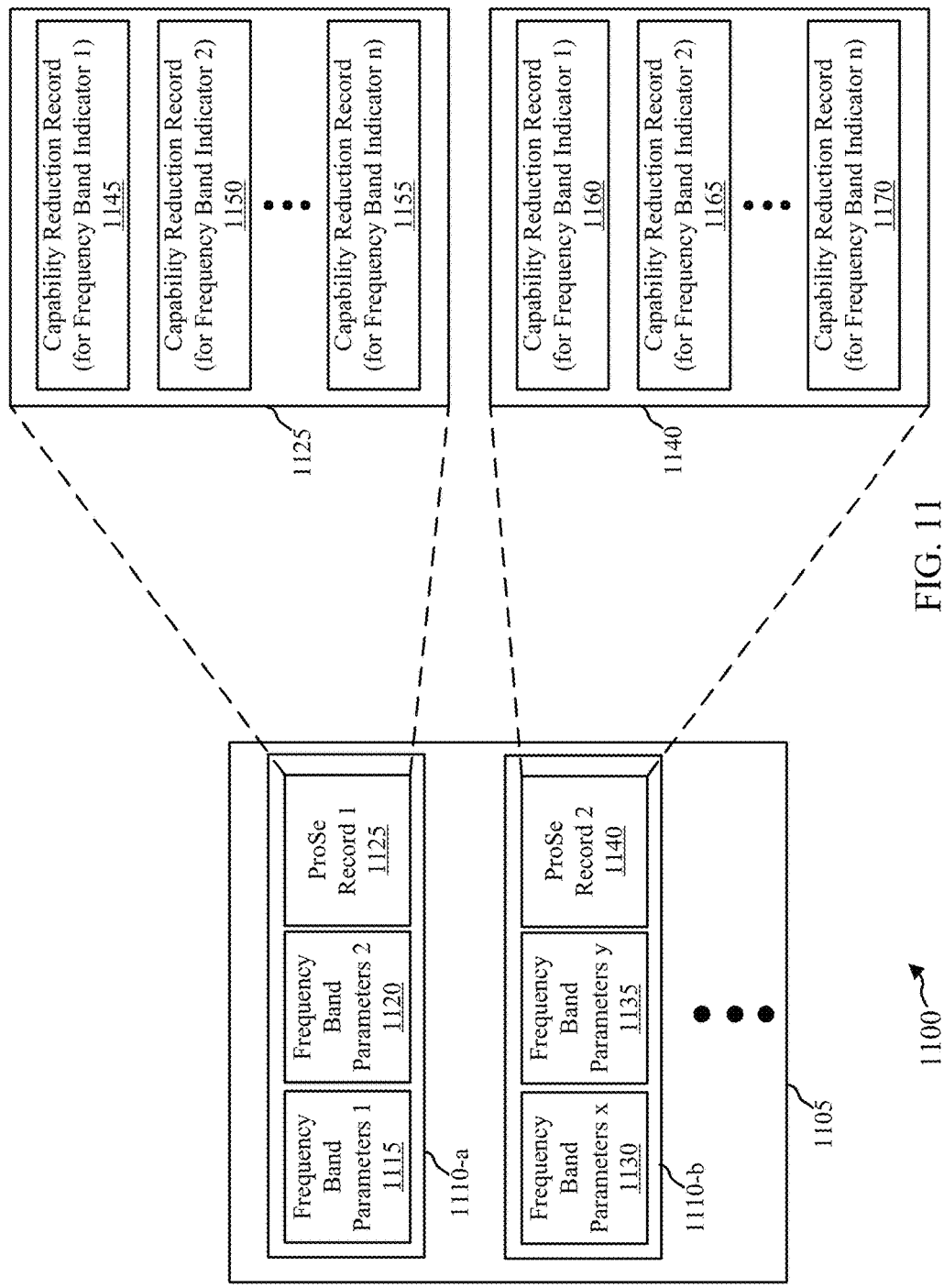
FIG. 11 shows a diagram illustrating aspects of supported frequency band combination parameter, in accordance with various aspects of the present disclosure.

FIG. 11 is a diagram 1100 illustrating aspects of supported frequency band combination parameter, in accordance with various aspects of the present disclosure. The diagram 1100 may illustrate aspects of the system 100, 500 and/or 800 described with reference to FIG. 1, 5, or 8, respectively. The diagram 1100 may be implemented by one or more of the UEs 115 and/or devices 115 described above with respect to FIGS. 1, 2, 3, 4, and/or 5. In some examples, a system device, such as one of the UEs 115 and/or base stations 105 may execute one or more sets of codes to control the functional elements of the device to perform some or all of the functions described below.

The diagram 1100 may include a supported frequency band combination field 1105. The supported frequency band combination 1105 may include a frequency band combination parameter 1110 for, in some examples, the combinations of frequency bands that are supported for non-D2D communications, e.g., CA communications. The frequency band combination parameter 1110 may include a parameter field for a first frequency band 1115, a parameter for the second frequency band 1120, and a proximity service record 1125. The first and second frequency bands may comprise the frequency band combination used for non-D2D communications. As illustrated in FIG. 11, the frequency band combination parameter 1110 may include an associated proximity service record 1125 and the proximity service record 1125 may be unique to the associated frequency band combination parameter 1110.

The proximity service record 1125 may include a capability reduction record for the frequency bands supported for D2D proximity service communications. For example, the first proximity service record 1125 may include capability reduction records 1145, 1150, and 1155, corresponding to frequency band indicators 1, 2, through n, respectively. Similarly, the second proximity service record 1140 may include capability reduction records 1160, 116, and 1170, corresponding to frequency band indicators 1, 2, through n, respectively. The capability reduction records may include information indicative of a reduced non-D2D communication capability when the supported D2D frequency band is used for D2D proximity service communications. For example, the capability reduction record 1145 may include information indicating the reduced capabilities for non-D2D communications via the frequency band combination parameter 1110-*a* when the D2D frequency band 1 is being used for active D2D proximity service communications. The capability reduction record 1160 conveys the reduced capability for non-D2D communications via the frequency band combination parameter 1110-*b*. Accordingly, the supported frequency band combination 1105 may convey an indication of the supported frequency band combinations for non-D2D communications, as well as a reduction in capabilities for non-D2D communications when D2D proximity service communications are active.

The supported frequency band list 1010 may include a frequency band list associated with frequency bands supported for D2D proximity service communications. The frequency band list may indicate the supported D2D frequency bands 1015 and include one or more frequency band parameters. In some examples, the frequency band list 1010 may include a record for the D2D frequency bands 1015 a UE supports for D2D proximity service communications.

Figure 12:
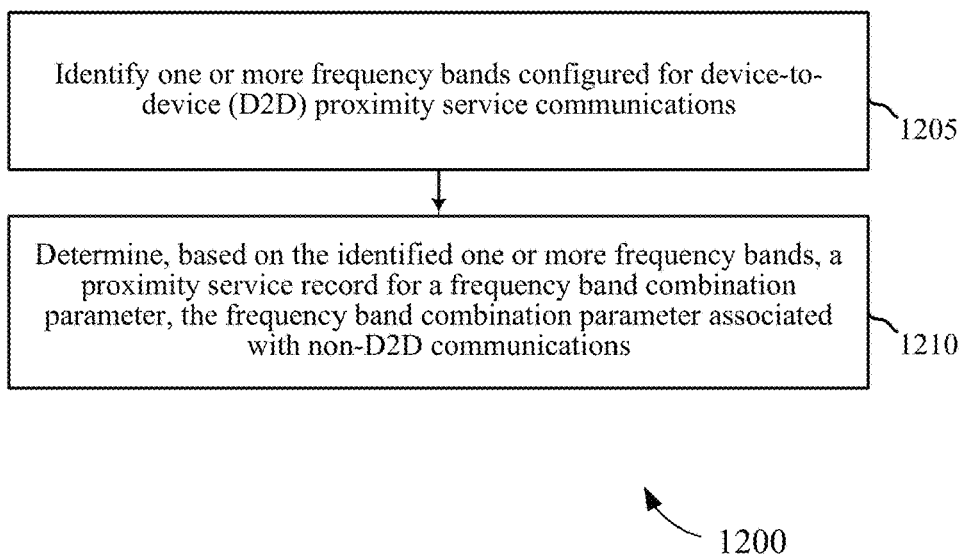
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs described with reference to FIG. 1, 6, 7, 8, 9, 10, or 11, and/or aspects of one or more of the devices described with reference to FIG. 2, 3, 4, or 5. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include the UE identifying one or more frequency bands supported for D2D proximity service communications. The D2D frequency bands may be identified in a frequency band list. At block 1210, the UE may determine, based on the identified D2D frequency bands, a proximity service record for a frequency band combination parameter. The frequency band combination parameter may include information associated with a combination of frequency bands supported for non-D2D communications, e.g., CA communications. The proximity service record may indicate, for the frequency band combination parameter, a reduction in non-D2D communication capabilities when active D2D proximity service communications are being conducted.

The operation(s) at blocks 1205 and 1210 may be performed using the D2D signaling module 210/510 described with reference to FIG. 2, 3, 4, or 5.

Thus, the method 1200 may provide for wireless communication. It should be noted that the method 1200 is just one implementation and that the operations of the method 1200 may be rearranged or otherwise modified such that other implementations are possible.

Figure 13:
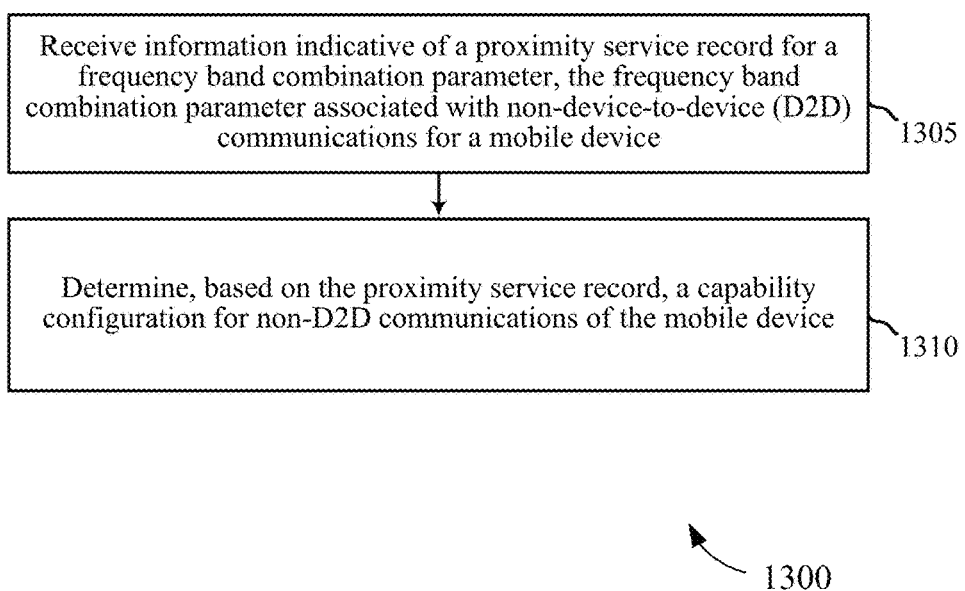
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations, apparatuses, and/or serving cells described with reference to FIG. 1, 6, 7, 8, 9, 10, or 11. In some examples, a base station may execute one or more sets of codes to control the functional elements of the base station to perform the functions described below. Additionally or alternatively, the base station may perform one or more of the functions described below using special-purpose hardware.

At block 1305, the method 1300 may include the base station receiving information indicative of a proximity service record for a frequency band combination parameter. The frequency band combination parameter may be associated with non-D2D communications for a mobile device (e.g., a UE). The proximity service record may convey information associated with a reduced capability for non-D2D communications via the frequency band combination parameter. At block 1310, the base station may determine, based on the proximity service record, a capability configuration for non-D2D communications for the mobile device. For example, the base station may determine that the mobile device is able to support a reduced non-D2D communication capability when the mobile device is engaged in active D2D proximity service communications. Similarly, the base station may determine that the mobile device is able to support full non-D2D communication capabilities when the mobile device is no longer engaged in active D2D proximity service communications.

The operation(s) at blocks 1305 and 1310 may be performed using the non-D2D capability module 610/810 described with reference to FIG. 6, 7, or 8.

Thus, the method 1300 may provide for wireless communication. It should be noted that the method 1300 is just one implementation and that the operations of the method 1300 may be rearranged or otherwise modified such that other implementations are possible.

Figure 14:
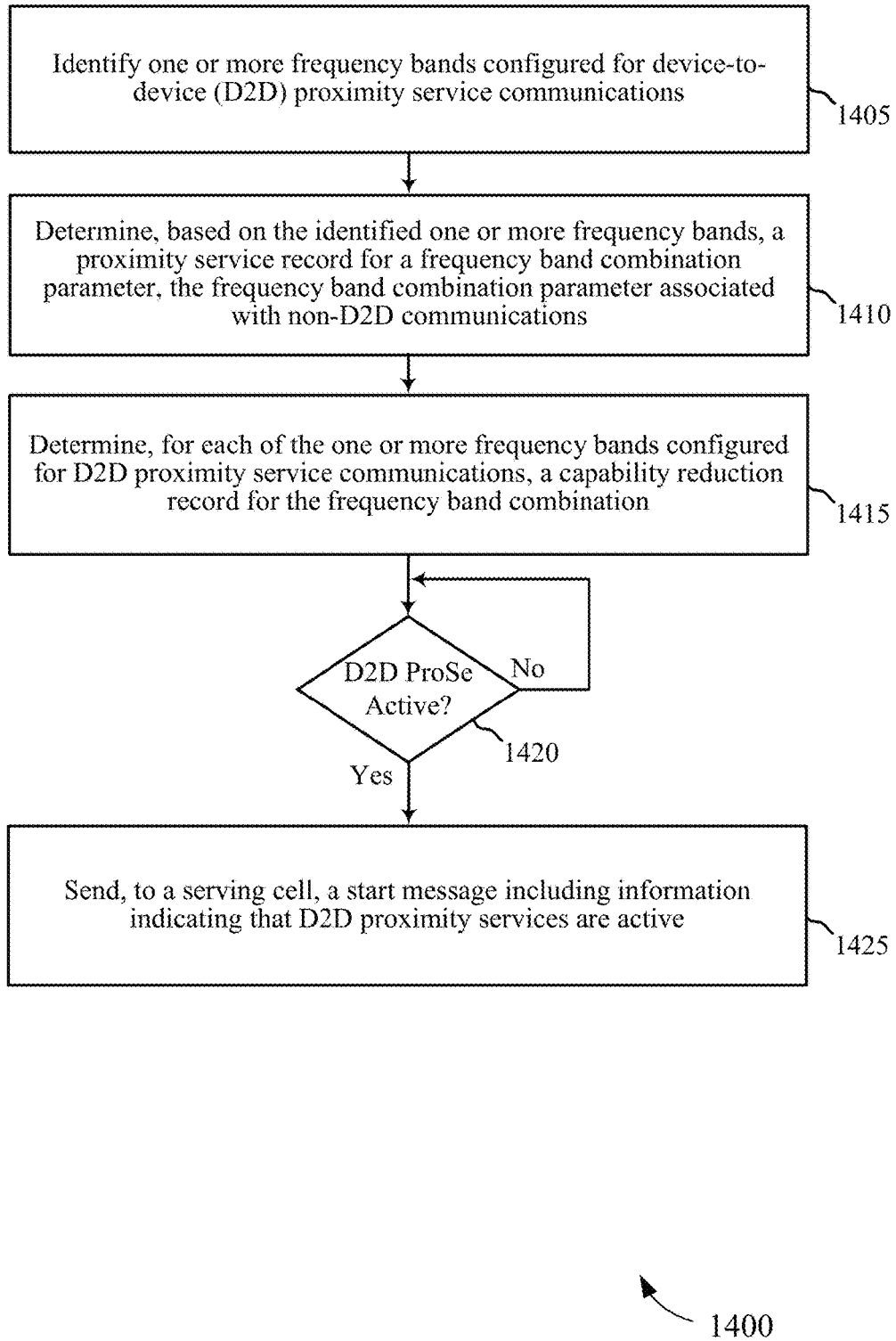
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs described with reference to FIG. 1, 6, 7, 8, 9, 10, or 11, and/or aspects of one or more of the devices described with reference to FIG. 2, 3, 4, or 5. In some examples, a UE may execute one or more sets of codes to control the functional elements of the UE to perform the functions described below. Additionally or alternatively, the UE may perform one or more of the functions described below using special-purpose hardware.

At block 1405, the method 1200 may include the UE identifying one or more frequency bands supported for D2D proximity service communications. The D2D frequency bands may be identified in a frequency band list. At block 1410, the UE may determine, based on the identified D2D frequency bands, a proximity service record for a frequency band combination parameter. The frequency band combination parameter may include information associated with a combination of frequency bands supported for non-D2D communications, e.g., CA communications.

At block 1415, the UE may determine, for the frequency bands supported for D2D proximity service communications, a capability reduction record for the frequency band combination. The capability reduction record may indicate, for the frequency band combination parameter and for the supported D2D frequency bands, a reduction in non-D2D communication capabilities when active D2D proximity service communications are being conducted.

At block 1420, the UE may determine whether active D2D proximity service communications are being conducted. If not, the UE may continue to monitor for the activation of D2D proximity service communications. If so, at block 1425, the UE may send a start message to a serving cell that includes an indication that the UE has started active D2D proximity service communications. In some examples, the start message may include an updated proximity service record to inform the serving cell of non-D2D communication capabilities supported during the active D2D proximity service communications.

The operation(s) at blocks 1405, 1410, 1415, 1420, and 1425 may be performed using the D2D signaling module 210/510 described with reference to FIG. 2, 3, 4, or 5.

Thus, the method 1400 may provide for wireless communication. It should be noted that the method 1400 is just one implementation and that the operations of the method 1400 may be rearranged or otherwise modified such that other implementations are possible.

In some examples, aspects from two or more of the methods 1200, 1300, and/or 1400 may be combined. It should be noted that the methods 1200, 1300, and 1400 are just example implementations, and that the operations of the methods 1200-1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
   identifying one or more frequency bands configured for device-to-device (D2D) proximity service communications;
   determining, based on the identified one or more frequency bands, a proximity service record indicative of communication capabilities associated with the identified one or more frequency bands based at least in part on a frequency band combination parameter, the frequency band combination parameter associated with a combination of one or more frequency bands available for non-D2D communications, wherein the proximity service record indicates non-D2D communication functions available when D2D proximity service communications are active; and
   transmitting the proximity service record to a serving cell.

2. The method of claim 1, further comprising:
   determining, based on the identified one or more frequency bands, a proximity service frequency band list; and
   sending, to a serving cell, a proximity service capability record comprising information indicative of the proximity service frequency band list.

3. The method of claim 2, wherein determining the proximity service capability record further comprises:
   determining one or more proximity service communication parameters associated with D2D proximity service communications.

4. The method of claim 3, wherein:
   the one or more proximity service parameters comprise one or more of a D2D discovery type capability, an asynchronous D2D discovery capability, an out-of-coverage discovery capability, a D2D communication mode capability, or a combination thereof.

5. The method of claim 1, wherein determining the proximity service record comprises:
   determining a first capability configuration for the non-D2D communications using the frequency band combination parameter; and
   determining a second capability configuration for the non-D2D communications based on the identified one or more frequency bands.

6. The method of claim 5, wherein determining the second capability configuration comprises:
   determining, for the identified one or more frequency bands, a capability reduction record for the frequency band combination parameter.

7. The method of claim 6, wherein the capability reduction record comprises information indicative of a reduced non-D2D communication capability when at least one of the identified one or more frequency bands is used for D2D proximity service communications.

8. The method of claim 6, wherein the capability reduction record comprises one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, a measurement capability indicator, or a combination thereof.

9. The method of claim 1, further comprising:
   sending, to a serving cell, a start message including information indicating that D2D proximity services are active.

10. The method of claim 9, wherein the start message further comprises an updated proximity service record for the frequency band combination parameter, the updated proximity service record based on the identified one or more frequency bands used for the active D2D proximity service communications.

11. The method of claim 9, further comprising:
    determining, based on D2D proximity services being active, a reduced capability for non-D2D communications.

12. The method of claim 11, further comprising:
    receiving, from the serving cell, a radio resource control (RRC) connection reconfiguration message comprising an indication of resources to utilize for the reduced capability for non-D2D communications.

13. The method of claim 12, further comprising:
    pausing non-D2D communications for a predetermined time period during an RRC connection reconfiguration procedure.

14. The method of claim 9, further comprising:
    determining, based on D2D proximity services being active, a reduced capability configuration for non-D2D communications when a pool of resources associated with D2D proximity service communications is provided.

15. The method of claim 14, further comprising:
    pausing non-D2D communications for a predetermined period of time to conduct radio frequency tuning operations, wherein the pausing occurs before and after accessing the pool of resources for D2D proximity service communications.

16. The method of claim 1, further comprising:
    sending, to a serving cell, a stop message including information indicating that D2D proximity services are inactive.

17. The method of claim 16, wherein the stop message further comprises an updated proximity service record for the frequency band combination parameter, the updated proximity service record based on the identified one or more frequency bands being available due to the inactive D2D proximity service communications.

18. The method of claim 16, further comprising:
determining, based on D2D proximity services being inactive, a full capability configuration for D2D proximity service communications.

19. The method of claim 1, wherein the non-D2D communications comprise carrier aggregation communications.

20. An apparatus for wireless communications, comprising:
a processor;
memory in electronic communication with the processor; and
instructions being stored in the memory, the instructions being executable by the processor to:
identify one or more frequency bands configured for device-to-device (D2D) proximity service communications;
determine, based on the identified one or more frequency bands, a proximity service record indicative of communication capabilities associated with the identified one or more frequency bands based at least in part on a frequency band combination parameter, the frequency band combination parameter associated with a combination of one or more frequency bands available for non-D2D communications, wherein the proximity service record indicates non-D2D communication functions available when D2D proximity service communications are active; and
transmit the proximity service record to a serving cell.

21. The apparatus of claim 20, further comprising instructions executable by the processor to:
determine, based on the identified one or more frequency bands, a proximity service frequency band list; and
send, to a serving cell, a proximity service capability record comprising information indicative of the proximity service frequency band list.

22. The apparatus of claim 21, wherein the instructions executable to determine the proximity service capability record are further executable to:
determine one or more proximity service communication parameters associated with D2D proximity service communications.

23. The apparatus of claim 22, wherein:
the one or more proximity service parameters comprise one or more of a D2D discovery type capability, an asynchronous D2D discovery capability, an out-of-coverage discovery capability, a D2D communication mode capability, or a combination thereof.

24. The apparatus of claim 20, wherein the instructions executable to determine the proximity service record are further executable to:
determine a first capability configuration for the non-D2D communications using the frequency band combination parameter; and
determine a second capability configuration for the non-D2D communications based on the identified one or more frequency bands.

25. The apparatus of claim 24, wherein the instructions executable to determine the second capability configuration are further executable to:
determine, for the identified one or more frequency bands, a capability reduction record for the frequency band combination parameter.

26. The apparatus of claim 25, wherein the capability reduction record comprises information indicative of a reduced non-D2D communication capability when at least one of the identified one or more frequency bands is used for D2D proximity service communications.

27. The apparatus of claim 25, wherein the capability reduction record comprises one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, a measurement capability indicator, or a combination thereof.

28. The apparatus of claim 20, further comprising instructions executable by the processor to:
send, to a serving cell, a start message including information indicating that D2D proximity services are active.

29. An apparatus for wireless communications, comprising:
means for identifying one or more frequency bands configured for device-to-device (D2D) proximity service communications;
means for determining, based on the identified one or more frequency bands, a proximity service record indicative of communication capabilities associated with the identified one or more frequency bands based at least in part on a frequency band combination parameter, the frequency band combination parameter associated with a combination of one or more frequency bands available for non-D2D communications, wherein the proximity service record indicates non-D2D communication functions available when D2D proximity service communications are active; and
means for transmitting the proximity service record to a serving cell.

30. The apparatus of claim 29, further comprising:
means for determining, based on the identified one or more frequency bands, a proximity service frequency band list; and
means for sending, to a serving cell, a proximity service capability record comprising information indicative of the proximity service frequency band list.

31. The apparatus of claim 30, wherein the means for determining the proximity service capability record further comprises:
means for determining one or more proximity service communication parameters associated with D2D proximity service communications.

32. The apparatus of claim 31, wherein:
the one or more proximity service parameters comprise one or more of a D2D discovery type capability, an asynchronous D2D discovery capability, an out-of-coverage discovery capability, a D2D communication mode capability, or a combination thereof.

33. The apparatus of claim 29, wherein the means for determining the proximity service record comprises:
means for determining a first capability configuration for the non-D2D communications using the frequency band combination parameter; and
means for determining a second capability configuration for the non-D2D communications based on the identified one or more frequency bands.

34. A non-transitory computer-readable medium storing computer executable code for wireless communication, the code executable by the processor to:
identify one or more frequency bands configured for device-to-device (D2D) proximity service communications;

determine, based on the identified one or more frequency bands, a proximity service record indicative of communication capabilities associated with the identified one or more frequency bands based at least in part on a frequency band combination parameter, the frequency band combination parameter associated with a combination of one or more frequency bands available for non-D2D communications, wherein the proximity service record indicates non-D2D communication functions available when D2D proximity service communications are active; and transmit the proximity service record to a serving cell.

35. A method for wireless communications, comprising:

receiving, at a serving cell, a proximity service record indicative of communication capabilities associated with one or more frequency bands configured for device-to-device (D2D) proximity service communications based at least in part on a frequency band combination parameter, the frequency band combination parameter associated with a combination of one or more frequency bands available for non-D2D communications for a mobile device, wherein the proximity service record indicates non-D2D communication functions available for the mobile device when D2D proximity service communications are active; and determining, based on the proximity service record, a capability configuration for non-D2D communications of the mobile device.

36. The method of claim 35, wherein the proximity service record comprises a capability reduction record for the frequency band combination parameter.

37. The method of claim 36, wherein the capability reduction record comprises information indicative of a reduced non-D2D communication capability when at least one of one or more frequency bands associated with D2D proximity service communications is in use.

38. The method of claim 37, wherein the capability reduction record comprises one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, and a measurement capability indicator.

39. The method of claim 35, further comprising:

receiving a start message from the mobile device that D2D proximity service communications are active.

40. The method of claim 39, wherein the start message further comprises an updated proximity service record for the frequency band combination parameter, the updated proximity service record based on one or more frequency bands used for the active D2D proximity service communications.

41. The method of claim 39, further comprising:

determining, based on the D2D proximity service communications being active, a reduced capability for non-D2D communications.

42. The method of claim 35, further comprising:

receiving a stop message from the mobile device that D2D proximity service communications are inactive.

43. The method of claim 42, wherein the stop message further comprises an updated proximity service record for the frequency band combination parameter, the updated proximity service record based on one or more frequency bands associated with D2D proximity service communications being available due to the inactive D2D proximity service communications.

44. The method of claim 42, further comprising:

determining, based on the D2D proximity service communications being inactive, a full capability configuration for non-D2D communications.

45. The method of claim 35, further comprising:

scheduling one or more resources for the mobile device based on the proximity service record.

46. The method of claim 35, wherein the information indicative of the proximity service record is received from the mobile device.

47. The method of claim 35, wherein the information indicative of the proximity service record is received from a network entity.

48. The method of claim 35, further comprising:

receiving a proximity service capability record comprising information indicative of a proximity service frequency band list and one or more proximity service communication parameters.

49. The method of claim 48, wherein the one or more proximity service parameters comprise one or more of a D2D discovery type capability, an asynchronous D2D discovery capability, an out-of-coverage discovery capability, and a D2D communication mode capability.

50. An apparatus for wireless communications, comprising:

a processor;

memory in electronic communication with the processor; and instructions being stored in the memory, the instructions being executable by the processor to:

receive, at a serving cell, a proximity service record indicative of communication capabilities associated with one or more frequency bands configured for device-to-device (D2D) proximity service communications based at least in part on a frequency band combination parameter, the frequency band combination parameter associated with a combination of one or more frequency bands available for non-D2D communications for a mobile device, wherein the proximity service record indicates non-D2D communication functions available for the mobile device when D2D proximity service communications are active; and determine, based on the proximity service record, a capability configuration for non-D2D communications of the mobile device.

51. The apparatus of claim 50, wherein the proximity service record comprises a capability reduction record for the frequency band combination parameter.

52. The apparatus of claim 51, wherein the capability reduction record comprises information indicative of a reduced non-D2D communication capability when at least one of one or more frequency bands associated with D2D proximity service communications is in use.

53. The apparatus of claim 51, wherein the capability reduction record comprises one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, and a measurement capability indicator.

54. The apparatus of claim 50, further comprising instructions executable by the processor to:

receive a start message from the mobile device that D2D proximity service communications are active.

55. The apparatus of claim 54, wherein the start message further comprises an updated proximity service record for the frequency band combination parameter, the updated proximity service record based on one or more frequency bands used for the active D2D proximity service communications.

56. The apparatus of claim 54, further comprising instructions executable by the processor to:
determine, based on the D2D proximity service communications being active, a reduced capability for non-D2D communications.

57. The apparatus of claim 50, further comprising instructions executable by the processor to:
receive a stop message from the mobile device that D2D proximity service communications are inactive.

58. The apparatus of claim 57, wherein the stop message further comprises an updated proximity service record for the frequency band combination parameter, the updated proximity service record based on one or more frequency bands associated with D2D proximity service communications being available due to the inactive D2D proximity service communications.

59. The apparatus of claim 57, further comprising instructions executable by the processor to:
determine, based on the D2D proximity service communications being inactive, a full capability configuration for non-D2D communications.

60. The apparatus of claim 50, further comprising instructions executable by the processor to:
schedule one or more resources for the mobile device based on the proximity service record.

61. An apparatus for wireless communication, comprising:
means for receiving, at a serving cell, a proximity service record indicative of communication capabilities associated with one or more frequency bands configured for device-to-device (D2D) proximity service communications based at least in part on a frequency band combination parameter, the frequency band combination parameter associated with a combination of one or more frequency bands available for non-D2D communications for a mobile device, wherein the proximity service record indicates non-D2D communication functions available for the mobile device when D2D proximity service communications are active; and
means for determining, based on the proximity service record, a capability configuration for non-D2D communications of the mobile device.

62. The apparatus of claim 61, wherein the proximity service record comprises a capability reduction record for the frequency band combination parameter.

63. The apparatus of claim 62, wherein the capability reduction record comprises information indicative of a reduced non-D2D communication capability when at least one of one or more frequency bands associated with D2D proximity service communications is in use.

64. The apparatus of claim 63, wherein the capability reduction record comprises one or more of a simultaneous D2D and non-D2D transmission capability indicator, a simultaneous D2D and non-D2D reception capability indicator, a contiguous intra-band uplink bandwidth reduction indicator, a contiguous intra-band downlink bandwidth reduction indicator, and a measurement capability indicator.

65. The apparatus of claim 61, further comprising:
means for receiving a start message from the mobile device that D2D proximity service communications are active.

66. A non-transitory computer-readable medium storing computer executable code for wireless communication, the code executable by a processor to:
receive, at a serving cell, a proximity service record indicative of communication capabilities associated with one or more frequency bands configured for device-to-device (D2D) proximity service communications based at least in part on a frequency band combination parameter, the frequency band combination parameter associated with a combination of one or more frequency bands available for non-D2D communications for a mobile device, wherein the proximity service record indicates non-D2D communication functions available for the mobile device when D2D proximity service communications are active; and
determine, based on the proximity service record, a capability configuration for non-D2D communications of the mobile device.

* * * * *